(12) United States Patent
McCrossan et al.

(10) Patent No.: US 7,660,516 B2
(45) Date of Patent: Feb. 9, 2010

(54) RECORDING MEDIUM, REPRODUCTION DEVICE, PROGRAM, AND REPRODUCTION METHOD

(75) Inventors: Joseph McCrossan, Simi Valley, CA (US); Masayuki Kozuka, Osaka (JP); Tomoyuki Okada, Nara (JP)

(73) Assignee: Panasonic Corporation, Osaka (JP)

( * ) Notice: Subject to any disclaimer, the term of this patent is extended or adjusted under 35 U.S.C. 154(b) by 596 days.

(21) Appl. No.: 10/587,055

(22) PCT Filed: Feb. 17, 2005

(86) PCT No.: PCT/JP2005/002489

§ 371 (c)(1),
(2), (4) Date: Jul. 25, 2006

(87) PCT Pub. No.: WO2005/079064

PCT Pub. Date: Aug. 25, 2005

(65) Prior Publication Data

US 2007/0160344 A1    Jul. 12, 2007

Related U.S. Application Data

(60) Provisional application No. 60/545,080, filed on Feb. 17, 2004.

(51) Int. Cl.
*H04N 5/91* (2006.01)
(52) U.S. Cl. .......................... 386/95; 386/125; 386/126
(58) Field of Classification Search .................. 386/46, 386/95, 96, 98, 111, 112
See application file for complete search history.

(56) References Cited

U.S. PATENT DOCUMENTS

| | | | |
|---|---|---|---|
| 5,907,658 A | 5/1999 | Murase et al. | |
| 5,937,138 A | 8/1999 | Fukuda et al. | |
| 6,393,574 B1 * | 5/2002 | Kashiwagi et al. | 713/400 |
| RE37,994 E | 2/2003 | Fukuda et al. | |
| 6,701,064 B1 | 3/2004 | De Haan et al. | |
| 2005/0105888 A1 | 5/2005 | Hamada et al. | |
| 2005/0196143 A1 | 9/2005 | Kato et al. | |
| 2006/0045481 A1 | 3/2006 | Yahata et al. | |
| 2006/0050088 A1 | 3/2006 | Yahata et al. | |

FOREIGN PATENT DOCUMENTS

| | | |
|---|---|---|
| EP | 1085513 A2 | 3/2001 |
| EP | 1 608 165 | 12/2005 |
| JP | 10271450 | 10/1998 |
| JP | 2001-160945 | 6/2001 |
| JP | 2002-533000 | 10/2002 |
| JP | 2004-304767 | 10/2004 |
| WO | 97/07504 | 2/1997 |

(Continued)

*Primary Examiner*—Huy T Nguyen
(74) *Attorney, Agent, or Firm*—Panasonic Patent Center; Dhiren Odedra; Kerry Culpepper

(57) ABSTRACT

An AV Clip formed by multiplexing a video stream and a graphics stream and recorded on a BD-ROM as a recording medium. The video stream constitutes a moving picture while the graphics stream enables graphics to be overlaid on the moving picture, and includes pieces of control information called a PCS and an ICS. When the AV Clip is played back immediately following playback of another digital stream, the control information indicates to the reproduction device that the presence of data already in memory of a graphics decoder is to be continuous.

10 Claims, 38 Drawing Sheets

FOREIGN PATENT DOCUMENTS

| | | |
|---|---|---|
| WO | WO97/13363 | 4/1997 |
| WO | WO97/13367 | 4/1997 |
| WO | 2004/068854 | 8/2004 |
| WO | 2004/077826 | 9/2004 |
| WO | 2004/102570 | 11/2004 |
| WO | 2004-343254 | 12/2004 |

* cited by examiner

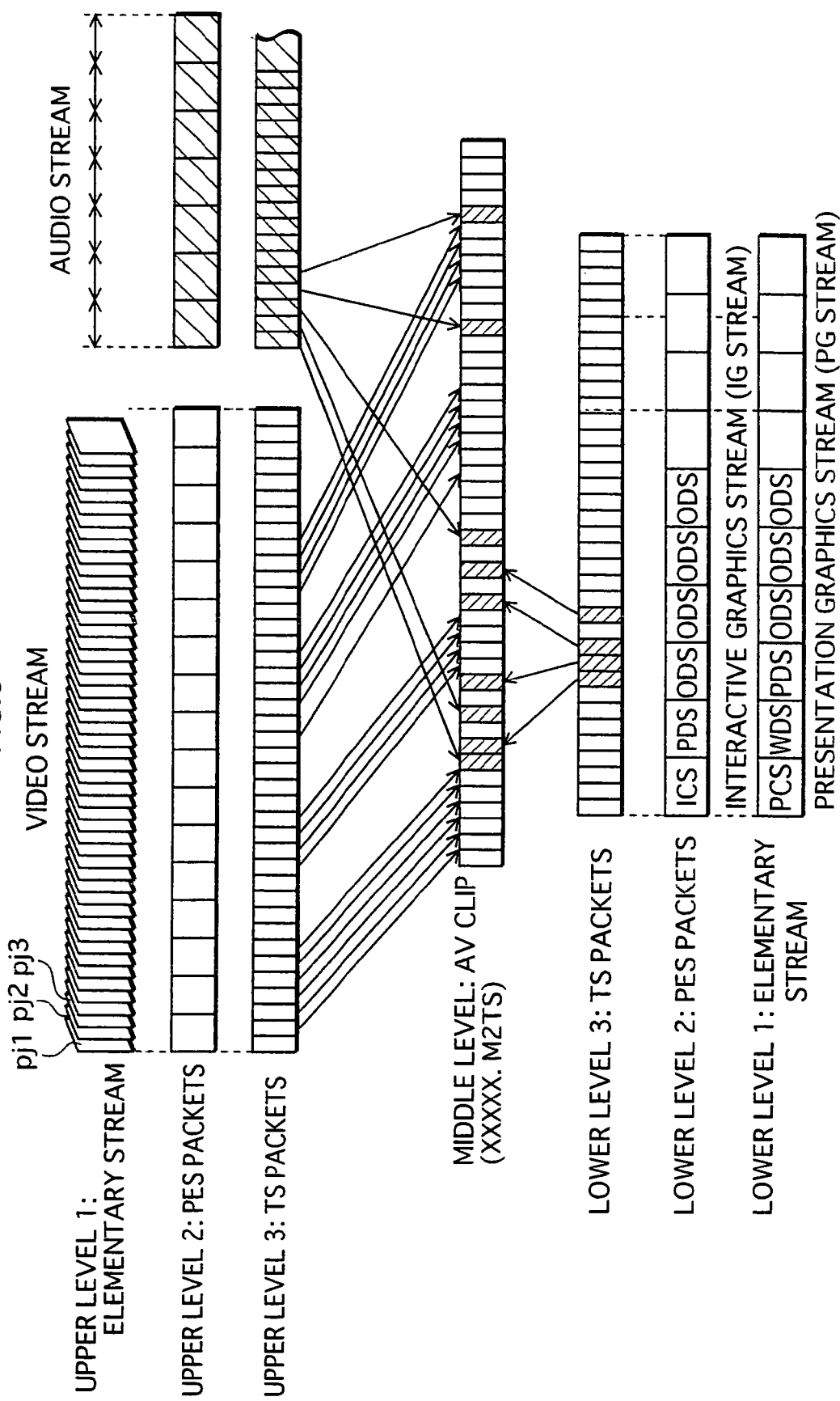

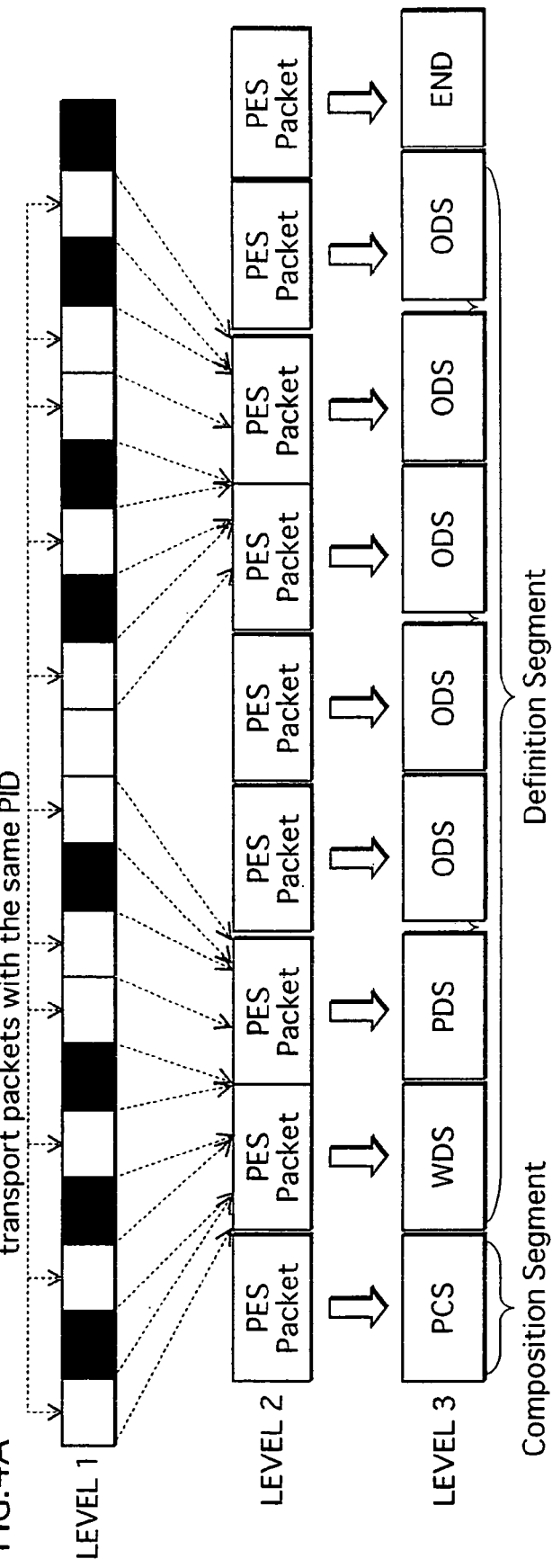
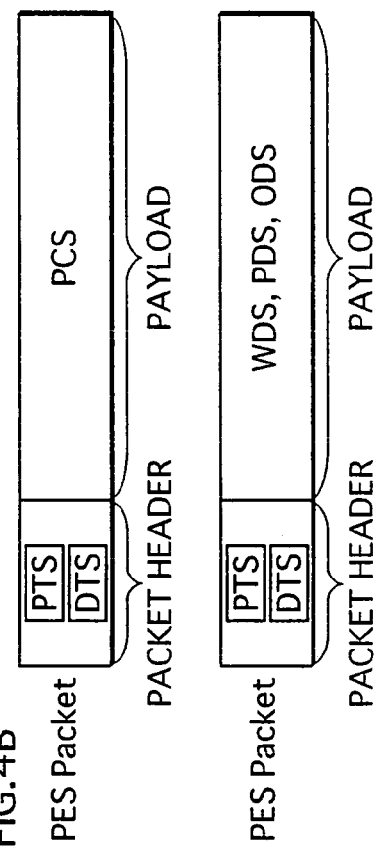

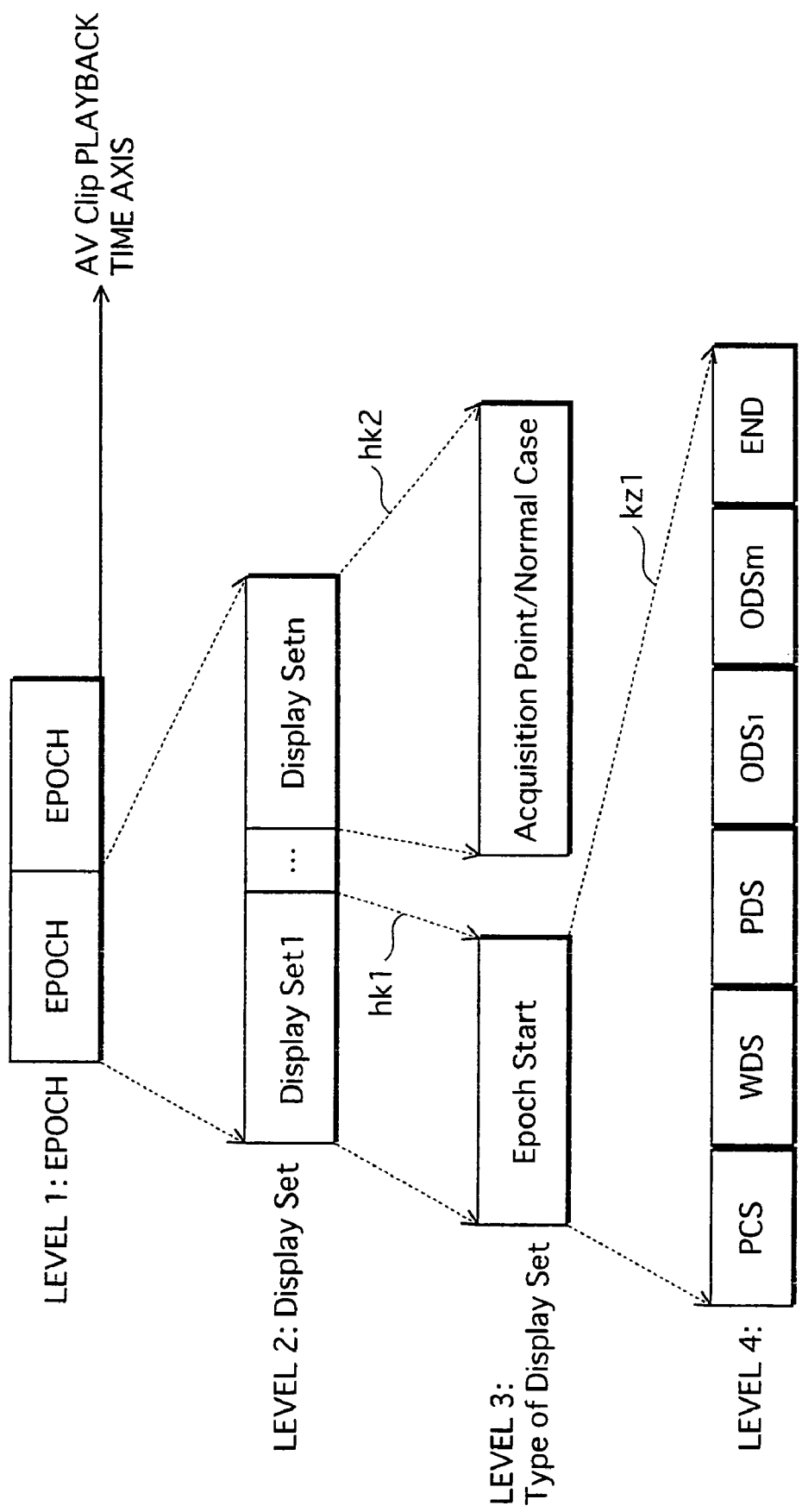

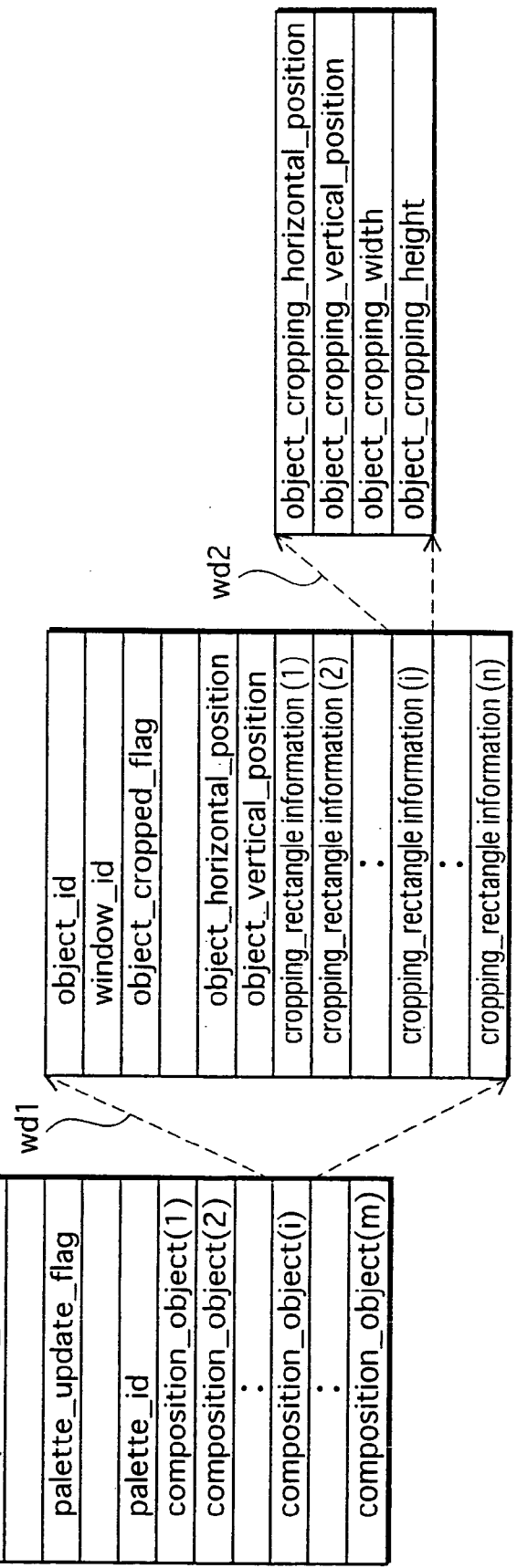

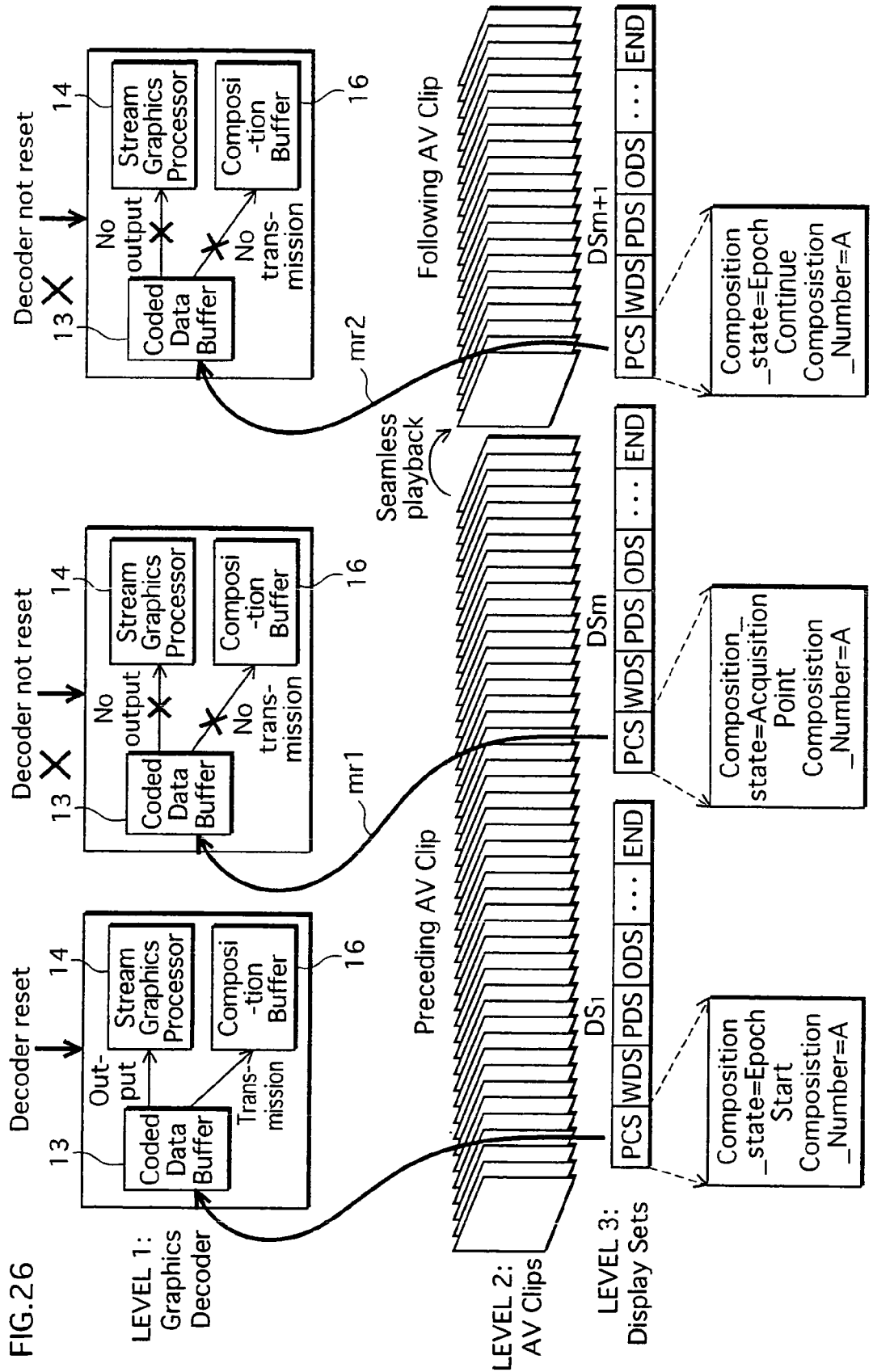

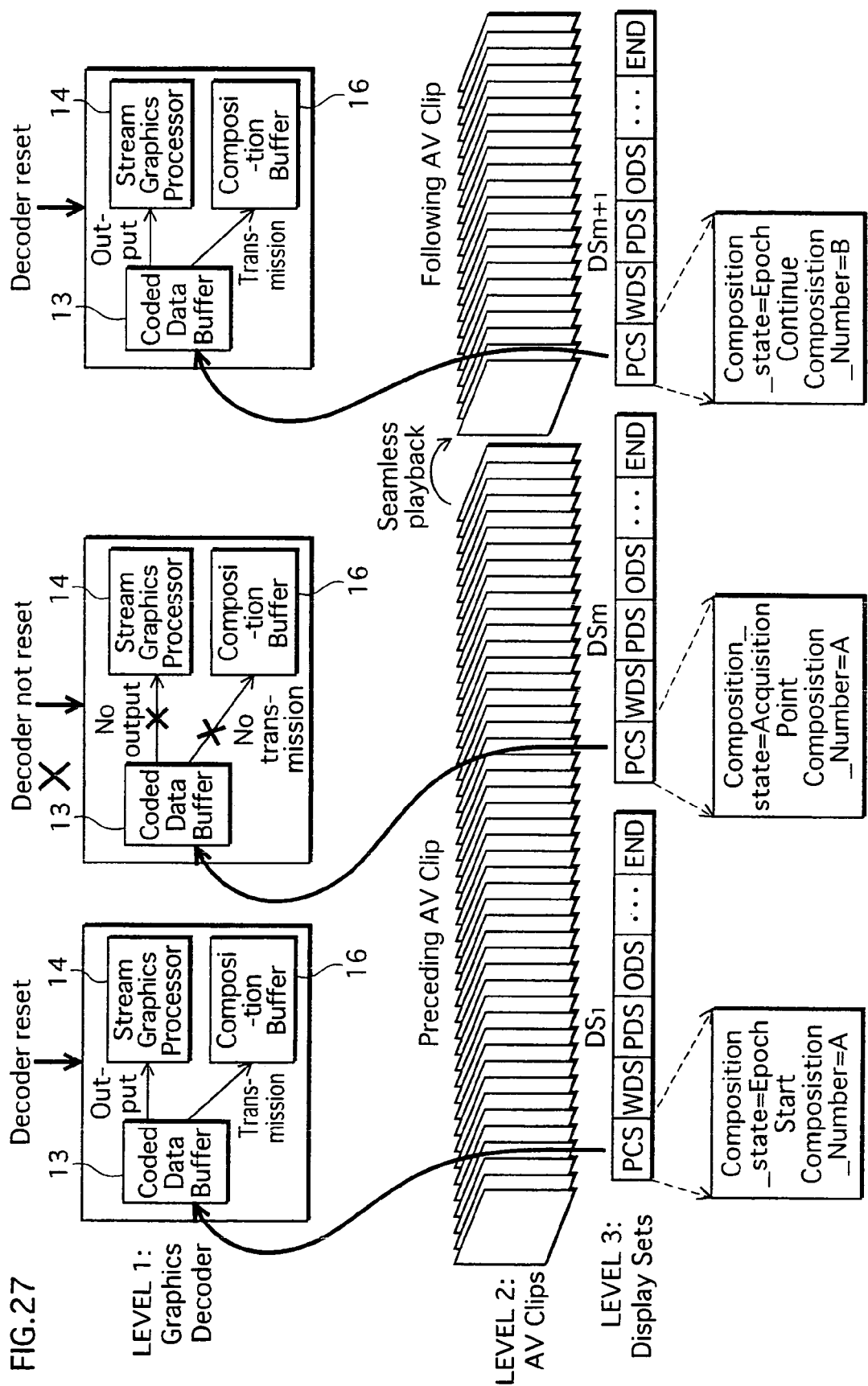

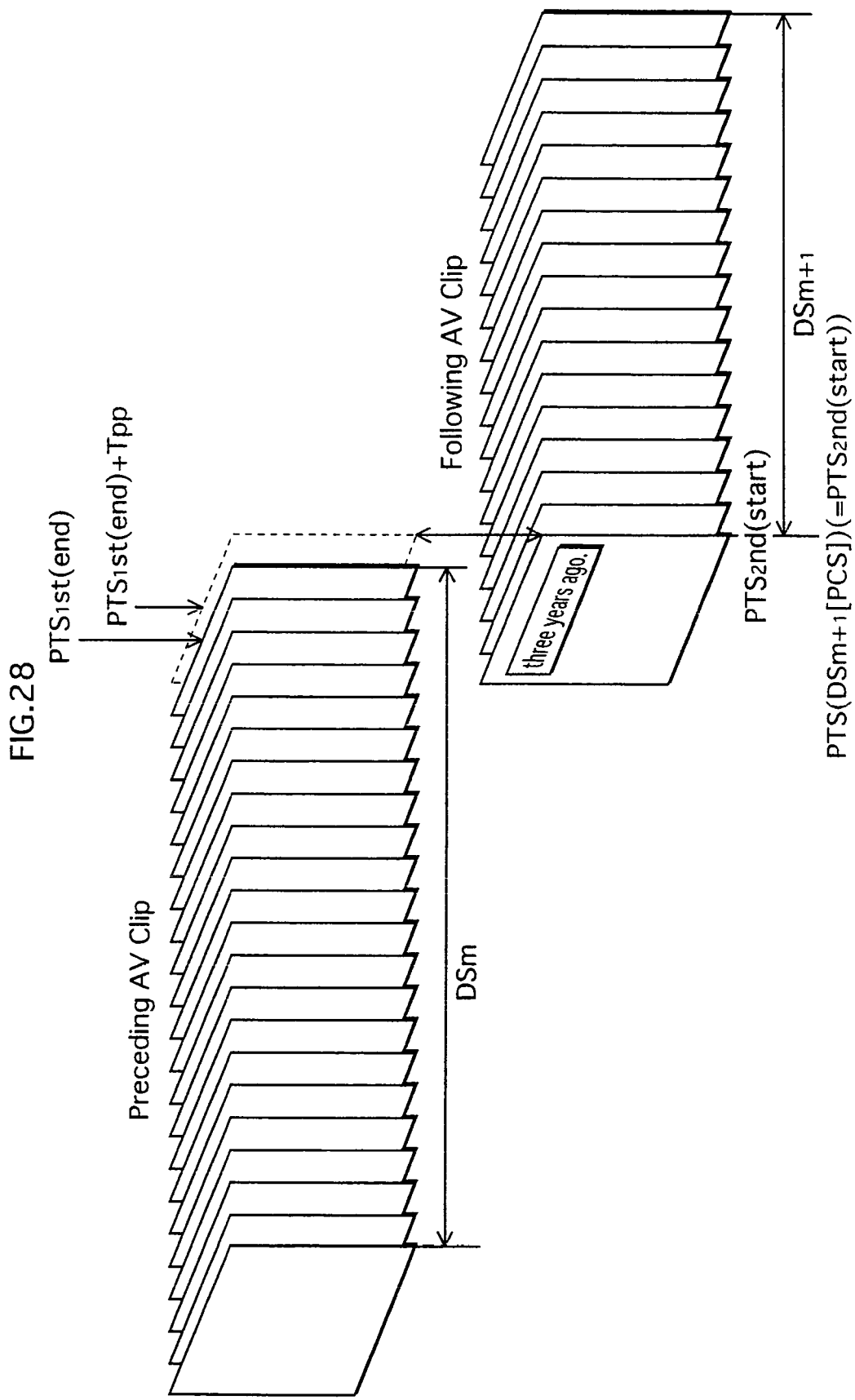

FIG.33 page()

| page_id | ← --- i) Page identifier |
| page_version_number | ← --- ii) Version number of content in page information data structure |
| UO_mask_table() | |
| in_effects() { | |
|     effect_sequence() | |
| } | |
| out_effects() { | |
|     effect_sequence() | |
| } | iii) Content of page information conveyed by data structure |
| animation_frame_rate_code | |
| default_selected_button_id_ref | |
| default_activated_button_id_ref | |
| palette_id_ref | |
| button information (0) | |
| button information (1) | |
| button information (2) | |
| ⋮ | |
| button (number_of_buttons−1) | |

RECORDING MEDIUM, REPRODUCTION DEVICE, PROGRAM, AND REPRODUCTION METHOD

CROSS-REFERENCE TO RELATED APPLICATIONS

This is a National Stage of International Application No. PCT/JP05/02489, filed Feb. 17, 2005, which claims benefit of U.S. Provisional Application No. 60/545,080, filed Feb. 17, 2004.

TECHNICAL FIELD

The present invention relates to seamless playback, and more specifically to improvements in consumer reproduction devices and recording media which support GUI technology. Typical examples of such recording media are BD-ROM (Blu-ray Disc Read Only Memory) and DVD-video.

BACKGROUND ART

Seamless playback is used when playing back a plurality of digital streams to eliminate interruptions that occur when switching from one digital stream to the next. Multi-story movies in which the plot changes in response to user operations or device status (e.g. a rating level setting) are produced using seamless playback technology. There are currently many in the movie business who would like to make use of this technology to add value to their products and boost the share price of their company.

Each digital stream includes a video stream constituting a moving picture, an audio stream constituting sound, and elementary streams of various types, including a graphics stream constituting subtitles and menus. The above streams are multiplexed to form the digital stream. Technology that enables seamless playback of video streams multiplexed into a plurality of digital streams is disclosed in the patent documents 1 and 2.

Patent Document 1: International publication WO97/13367

Patent Document 2: International publication WO97/13363

DISCLOSURE OF THE PRESENT INVENTION

Problems the Present Invention Aims to Solve

When a movie is composed of a plurality of digital streams, each stream may be played back independently or immediately following another digital stream as part of a sequence. In conventional DVD reproduction devices, an internally provided video decoder (for decoding video stream data) makes a clear distinction between independent playback and playback immediately following another digital stream. In the latter, the conventional DVD reproduction device is able to realize seamless playback of the video stream by ensuring that the presence of data in memory in the video decoder is continuous. In an internally provided graphics decoder (for decoding graphics stream data), on the other hand, memory holding the graphics stream data is all cleared when switching from one digital stream to another. When the video streams are being played back seamlessly a given graphics stream may not be independent of the graphics stream in a preceding digital stream. However, even if the graphics streams are not independent, the graphics stored in the reproduction device will be cleared at the switch-over from one digital stream to another. As a result, momentary interruptions in the display of subtitles and menus occur at the switch-over.

Owing to the momentary interruptions that occur in the display of subtitles and menus, an author must expend time and effort selecting appropriate points at which to place digital stream boundaries. The boundaries may be chosen to include scenes without any lines and other sections where no subtitles or graphics appear. Thus, when a movie is being split into a plurality of digital streams using conventional technology, there is a problem in that the author is constrained to select portions not including speech as points for placing digital stream boundaries.

Consequently, when making multi-story type movies, it is often impossible to realize playback in accordance with the desired storyline.

The object of the present invention is to provide a recording medium that reduces constraints on the selection of boundaries and thereby simplifies the production of movies having a number of playback paths.

Means to solve the problem

In order to achieve the above object, the recording medium of the present invention is a recording medium having recorded thereon one or more digital streams each generated by multiplexing a video stream and a graphics stream, wherein the video stream constitutes a moving picture, the graphics stream constitutes graphics to be overlaid on the moving picture, and includes status information, and if the digital stream is to be played back by a reproduction device immediately following another digital stream, the status information indicates that presence of management data already in memory for graphics display is to be continuous.

Effects of the Present Invention

According to the above construction, the status information instructs the reproduction device to continue memory management at the playback switch-over from a preceding digital stream to an immediately following digital stream. Consequently, the reproduction device does not reset the graphics decoder when playback switches between the digital streams. Having menu management continue makes it possible to select a portion at which menus or subtitles are displayed at a digital stream boundary. This reduces constraints on the selection of points for placing boundaries between digital streams, and in the case of a multi-story type movie, enables playback that follows a desired storyline.

BRIEF DESCRIPTION OF THE DRAWINGS

FIG. 3 shows a schematic structure of an AV clip;

FIG. 4A shows a structure of a presentation graphics stream;

FIG. 4B shows PES packets obtained by converting functional segments;

FIG. 5 shows a logical structure made up of functional segments of various types;

FIG. 8A shows a data structure of a WDS;

FIG. 8B shows a data structure of a PCS;

FIG. 26 shows how Display Sets are read when playing back the two AV clips shown in FIG. 14;

FIG. 27 shows how Display Sets are read to a graphics decoder when skip playback of the AV Clip #2 is carried out in order;

FIG. 28 shows for comparison a PTS value of a video stream belonging to the preceding AV Clip and a PTS value of a video stream belonging to the following AV Clip;

FIG. 33 shows a data structure of page information for a given page (page y) among a plurality of pages in an x-th Display Set;

BEST MODE FOR CARRYING OUT THE PRESENT INVENTION

Figure 1:
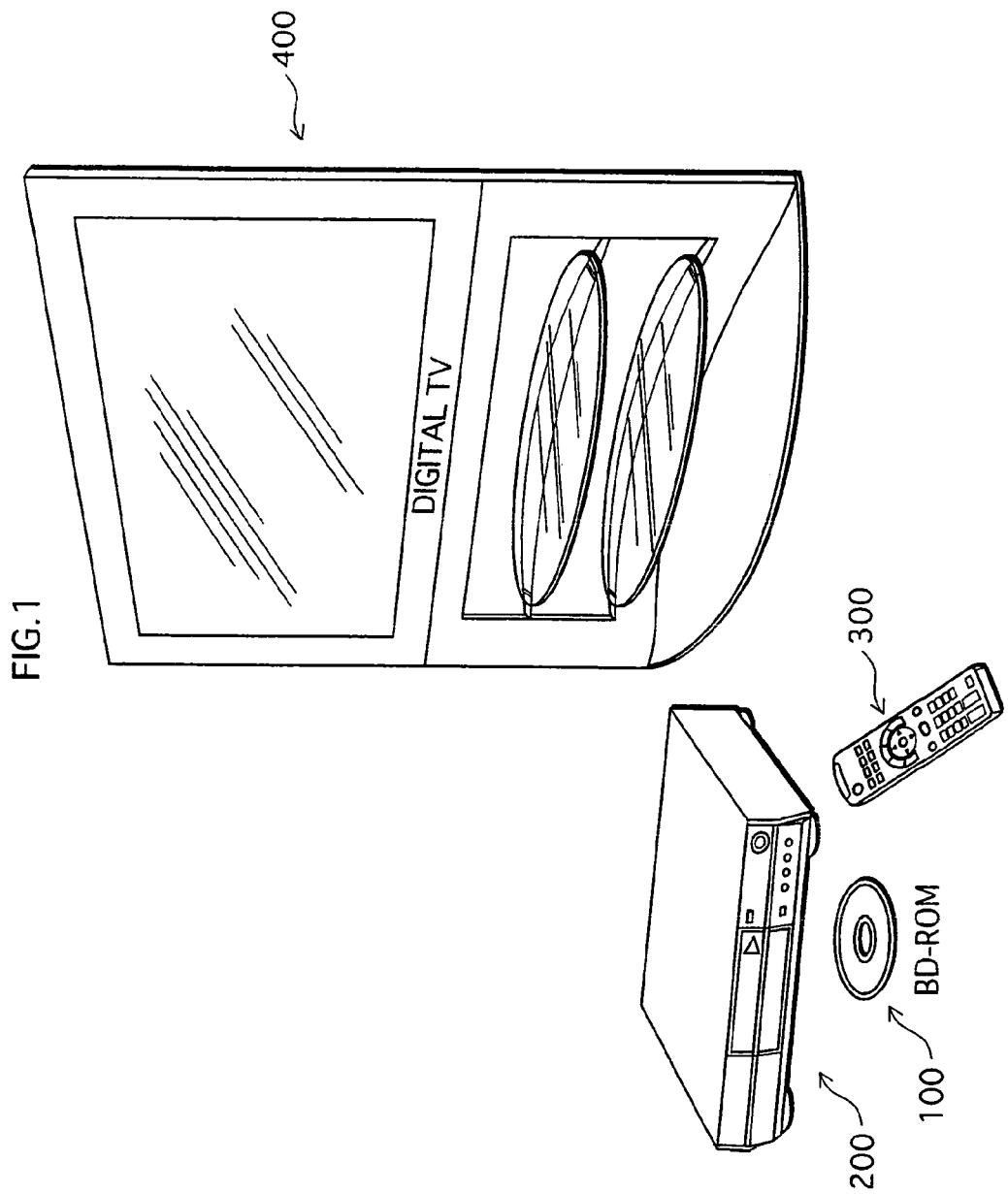
FIG. 1 shows a use of a recording medium of the present invention.

The following describes embodiments of the recording medium of the present invention. First, applications of the recording medium of the present invention are described. FIG. 1 shows an exemplary application of the recording medium. The recording medium in FIG. 1 is a BD-ROM 100. The BD-ROM 100 is used to provide movies in a home theater system that includes a reproduction device 200, a remote control 300, and television 400.

An application of the recording medium of the present invention is described above. The following describes a way of producing the recording medium. The recording medium can be produced by making improvements to a BD-ROM application layer.

Figure 2:
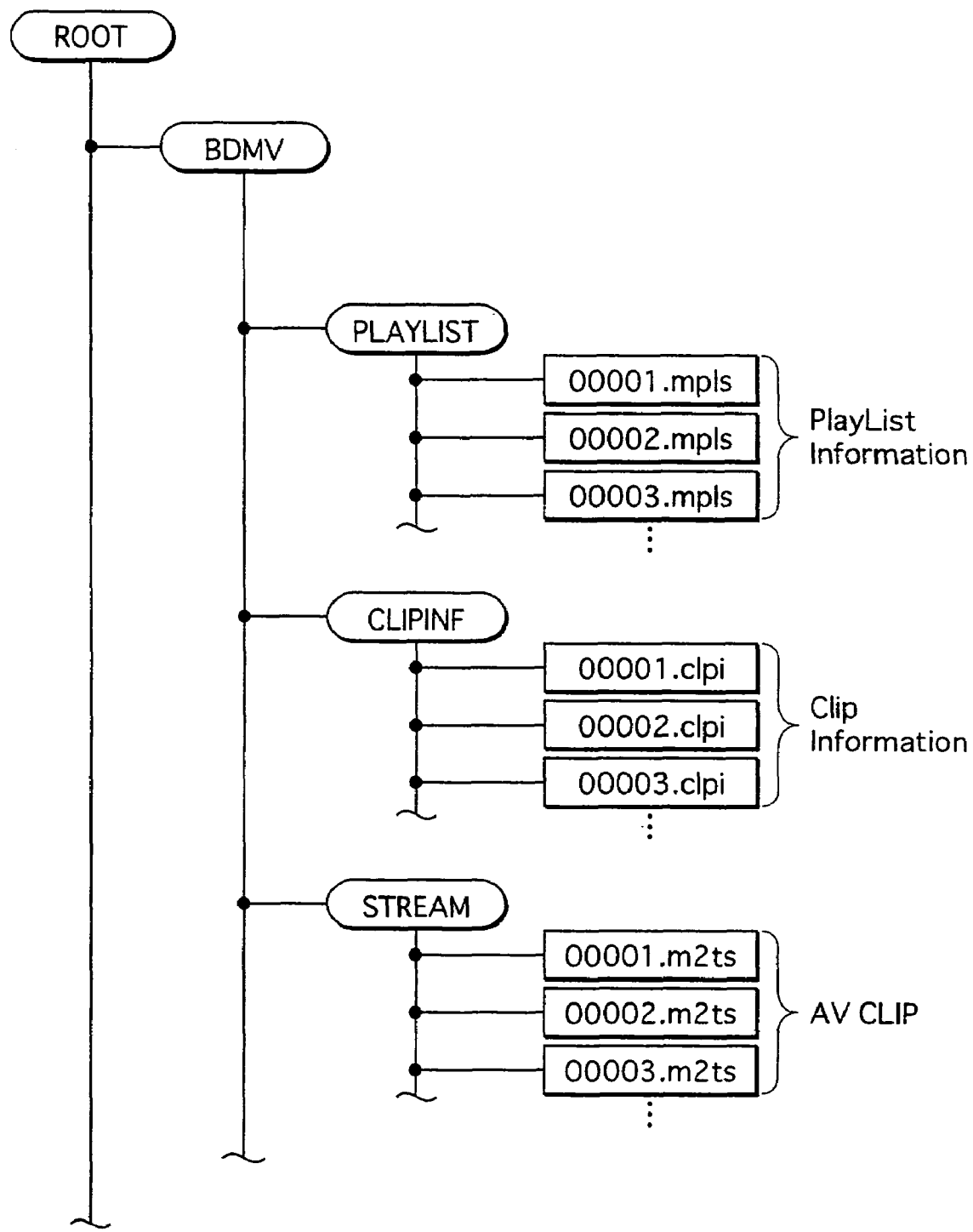
FIG. 2 shows an application layer format of a BD-ROM expressed using a directory structure.

FIG. 2 shows an application layer format of a BD-ROM expressed using a directory structure. As shown in FIG. 2, The BD-ROM includes a BDMV directory under a ROOT directory.

Subordinate to the ROOT directory there are four subdirectories. These are a PLAYLIST directory, a CLIPINF directory, a STREAM directory, and a BDJA directory. The STREAM directory stores a file group constituting digital streams. Each file has an extension "m2ts", and the file group includes 00001.m2ts, 00002.mts, and 00003.m2ts.

The PLAYLIST directory stores a file group constituting static scenarios. Each file has an extension "mpls", and the file group includes 00001.mpls, 00002.mpls, and 00003.mpls.

The CLIPINF directory stores a file group constituting static scenarios, similarly to the PLAYLIST directory. Each file has an extension "clpi", and the file group includes 00001.clpi, 00002.clpi, and 00003.clpi.

In FIG. 2, the files with the extension "m2ts" (00001.m2ts, 00002.mts, 00003.m2ts . . . ) store AV Clips. The AV Clips include Main Clips and Subclips. Each Main Clip is a digital stream generated by multiplexing a plurality of elementary streams, typical examples of which include a video stream, an audio stream, a presentation graphics stream (PG stream) constituting subtitles, and an interactive graphics stream (IG stream) constituting menus.

FIG. 3 shows a typical structure of an AV Clip.

The AV Clip (see middle level in FIG. 3) is constructed as follows. The video stream which is made up of a plurality of video frames (pictures pj1, pj2, pj3, . . . ) and the audio stream which is made up of a plurality of audio frames (upper level 1) are each converted to PES packets (upper level 2), and further converted to TS packets (upper level 3). Likewise, the Presentation Graphics stream (PG stream) which is made up of subtitles and the like and the Interactive Graphics stream (IG Stream) (lower level 1) are converted to PES packets (lower level 2), and subsequently converted to TS packets (lower level 3). These TS packets of the video, audio, Presentation Graphics and Interactive Graphics streams are multiplexed to generate the AV Clip.

When recorded on a BD-ROM each of the TS packets included in the AV Clip is allocated an extension header. The extension header is called TP_extra_header, is 4 bytes in length, and includes an arrival_time_stamp and a copy_permission_indicator. The TS packets with attached TP_extra_headers are collected into groups each containing 32 packets, and written to 3 sectors of the BD-ROM. Each group containing the 32 packets is 6144 bytes (=32×192) in size, and therefore matches the 6144-byte size (=2048×3) of the three sectors. In combination, the three sectors storing the 32 TS packets with attached TP_extra_headers are called an "Aligned Unit".

The AV clip is described above. The following describes the Presentation Graphics stream. FIG. 4A shows a structure of the Presentation Graphics stream. Level 1 shows the TS packets that make up the AV Clip. Level 2 shows the PES packets that make up the graphic stream. Each PES packet in level 2 is formed by extracting the payloads of TS packets with a prescribed PID from the TS packets in level 1, and combining the extracted payloads.

Level 3 shows a structure of the graphics stream. The graphics stream includes functional segments called a PCS (Presentation Composition Segment), a WDS (Window Definition Segment), PDS (Palette Definition Segment), an ODS (Object Definition Segment), and an END (END of Display Set Segment). Of these functional segments, the PCS is a screen composition segment, and the WDS, PDS, ODS and END are definition segments. The PES packets are in one-to-one correspondence with the functional segments. Each functional segment is either converted to a single PES packet and recorded on the BD-ROM or fragmented, converted to a plurality of PES packets and recorded on the BD-ROM.

FIG. 4B shows PES packets obtained by converting functional segments. As shown in FIG. 4B, the PES packets are composed of "packet headers" and "payload", where the payload is the functional segment. Besides the payload, each packet has a corresponding DTS and PTS. Hereinafter, the DTS and PTS in the header of the PES packet that contains the functional segment are regarded as the DTS and PTS of that functional segment.

These functional segments of various types make up a logical structure of the type shown in FIG. 5. In FIG. 5, level 3 shows functional segments, level 2 shows Display Sets, and level 1 shows Epochs. Each Display Set (abbreviated to DS) in level 2 is a string of functional segments, from the functional segments that make up the graphics stream, that together make up a single screen of graphics. In FIG. 5, broken lines kz1 indicate which DS the functional segments belong to. It is clear from the figure that the string of functional segments denoted by PCS-WDS-PDS-ODS-END compose one DS. The reproduction device reads the plurality of functional segments that compose the single DS to produce one screen of graphics.

Each Epoch in level 1 is a time period, on the playback time axis of the AV Clip, over which memory management is continuous, and a group of data allocated to that time unit. The memory to be managed includes a Graphics Plane for storing one screen of Graphics and an Object Buffer for storing uncompressed graphics data. Saying that memory management is continuous over the Epoch means that (i) neither the Graphics Plane nor Object Buffer is flushed during the Epoch (where to flush means to clear the entire Graphics Plane or the Entire Object Buffer), and (ii) deletion and rendering of graphics are performed only within a predetermined rectangular area of the Graphics Plane during the Epoch. In other words the rectangular area is fixed in size and position over the Epoch. When deletion and rendering of graphics is confined to the fixed rectangular area, synchronization of graphics and video is guaranteed. In other words, the Epoch is a time unit on the playback time axis during which the synchronization of video and graphics is guaranteed. To change the predetermined area for which rendering/deletion is performed, it is necessary to define a change point on the playback time axis and set a new Epoch from that point forward.

In this case, synchronization of video and graphics is not guaranteed at the boundary between the two epochs.

Figure 6:
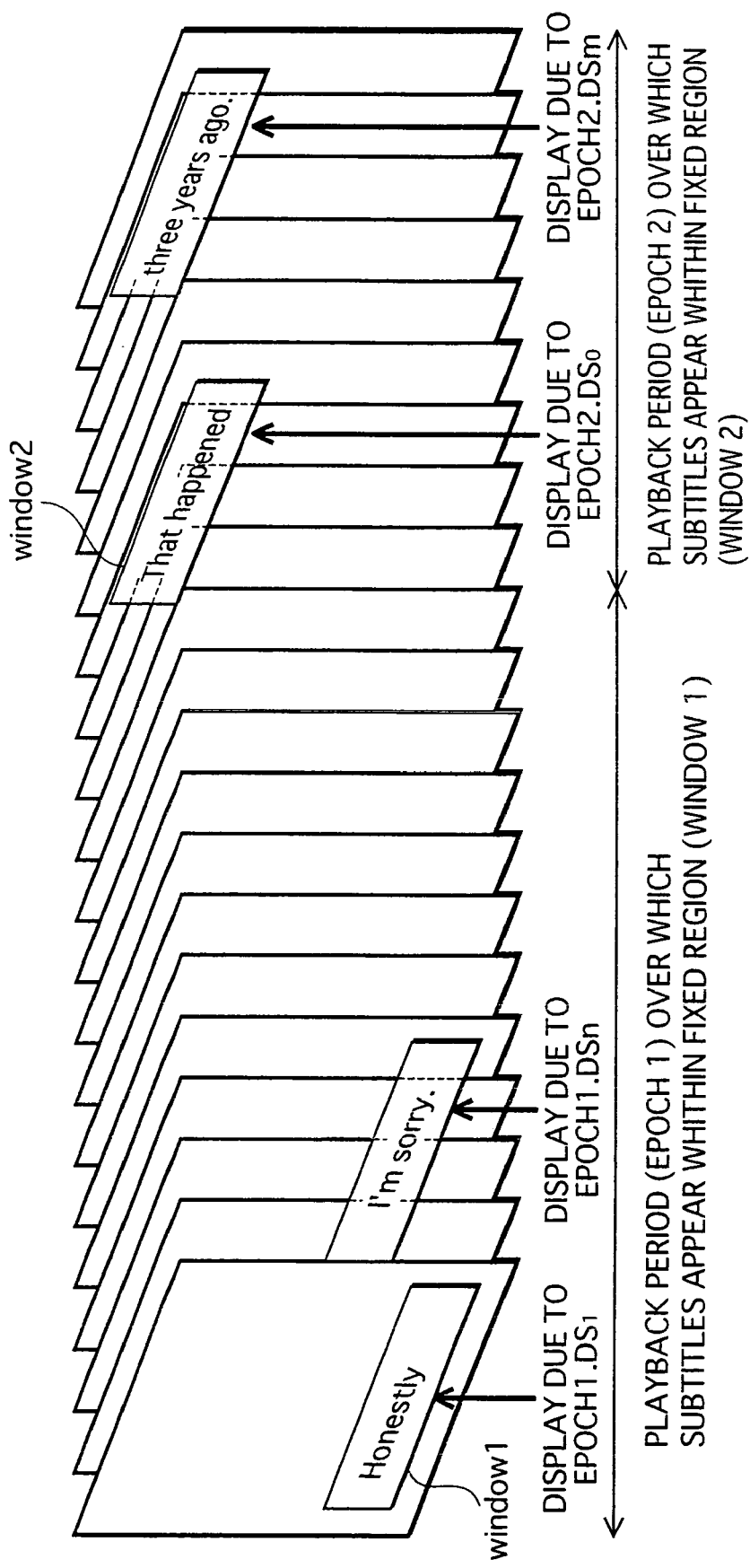
FIG. 6 shows a playback time axis of an AV Clip to which a DSn is allocated.

With regard to subtitling, a time period on the reproduction time axis during which subtitles appear within a fixed rectangular area can be a single Epoch. FIG. 6 shows the relationship between subtitle display positions and Epochs, and may be considered to show a situation in which subtitle display positions are changed depending on picture form. Of the four subtitles, which are "Honestly", "I'm sorry", "That happened" "three years ago", two are positioned at the top of the screen and two at the bottom. More specifically, "Honestly" and "I'm sorry" are at the bottom and "That happened" and "three years ago" are at the top. The subtitle display positions are altered so as to correspond with empty regions of the screen in order to make the subtitles easier to see. In this case, the time period on the AV Clip time playback time axis during which the subtitles are displayed at the bottom of the screen is Epoch1, and the time period during which the subtitles are displayed at the top of the screen is Epoch 2. Thus, each of the two Epochs has a separate subtitle rendering area. In Epoch 1, the subtitle rendering area (Window 1) is in the bottom margin of the screen. In Epoch 2 the subtitle rendering area (Window 2) is in the top margin of the screen. In each of Epoch 1 and Epoch 2 continuous memory management of the Graphics Plane and buffer is guaranteed, so the subtitles are displayed seamlessly in the corresponding margin. This completes the description of the Epoch. The following describes a Display Set.

In FIG. 5 broken lines hk1 and hk2 indicate an Epoch, in level 1, that contains the Display Sets in level 2. As is clear from FIG. 5, a series of DS, including an Epoch Start DS; an Acquisition Point DS, and a Normal Case DS, constitute the Epoch. Note that the Epoch Start DS, Acquisition Point DS, and Normal Case DS denote types of DS. Though the Acquisition Point DS precedes the Normal Case DS in FIG. 5, this is merely an example and the order may be reversed.

The Epoch Start DS indicates the beginning of a new Epoch. Thus, the Epoch Start DS contains all the functional segments necessary for a next screen composition. The Epoch Start DS is provided at a position likely to be chosen as a starting point, such as the beginning of a section in a movie.

The Acquisition Point DS is not an Epoch starting point, but contains all functional segments necessary for a next screen composition. As a result, graphics can be displayed reliably if playback is started from the Acquisition Point DS. In other words, the Acquisition Point DS enables screen composition from a midpoint in the Epoch.

The Acquisition Point DS is provided at a position that may be chosen as a starting point, such as a position that is specifiable using a time search. "Time search" is to an operation by which a user inputs a number of minutes/seconds to locate a playback point. If the input units are, say, 10 seconds (or 10 minutes), corresponding playback points positioned at intervals of 10 seconds (or 10 minutes), will be specifiable using the time search. If the Acquisition Point DSs are provided in positions that are specifiable using the time search, the graphics stream can be played back satisfactorily when the time search is performed.

The Normal Case DS contains only difference data relative to the previous Display Set. For example, if a DSv has the same subtitles as an immediately preceding DSu but has a different screen composition from the DSu, the DSv will be a Normal Case DS containing only a PCS and an END. With this arrangement, there is no need to provide ODSs that have already been provided. As a result, the amount of data stored on the BD-ROM can be reduced. On the other hand, it is not possible to display graphics using only the Normal Case DS containing difference data.

The following describes the Definition Segments (ODS, WDS, and PDS).

The Object_Definition_Segment is a functional segment for defining a graphics Object. The following describes this graphics Object. AV Clips recorded on BD-ROMs feature an image quality equivalent to that of high-definition television pictures. The resolution for displaying graphics Objects is set to an equivalently high 1920×1080. This high resolution permits reproduction of movie theater style subtitles (e.g. crisp handwriting style subtitles) using BD-ROMS. A graphics Object is made up of plurality of pieces of run-length data. Run-length data expresses a Pixel String using a Pixel Code that indicates a pixel value and a continuous length of the pixel value. The Pixel Code is 8 bits in length, and takes a value of 1 to 255. The Run-length data is able to select 256 colors of a possible 16,777,216 in accordance with the Pixel Code, and set the pixel color. Note that when a graphics Object is a subtitle, it is necessary to dispose a character string on a transparent background.

Figure 7A:
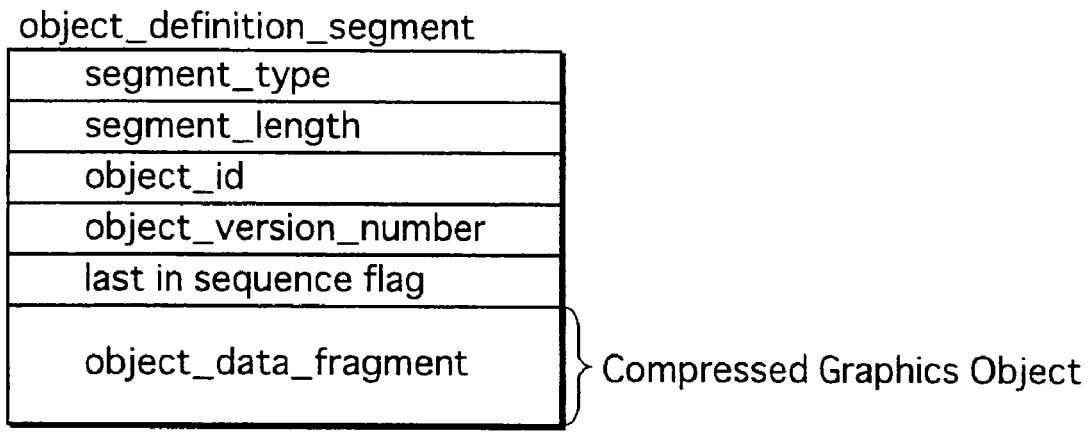
FIG. 7A shows a data structure of an ODS.

The ODS defines a graphics Object according to a data structure shown in FIG. 7A. As shown in FIG. 7A, the ODS is composed of a segment_type field indicating that the segment is of the ODS type, a segment_length field indicating a data length of the ODS, an object_id field uniquely identifying the graphics Object in the Epoch, an object_version_number field indicating a version of the ODS in the Epoch, a last_in_sequence_flag filed, and an object_data_fragment field containing a consecutive sequence of bytes corresponding to part or all of the graphics Object.

Figure 7B:
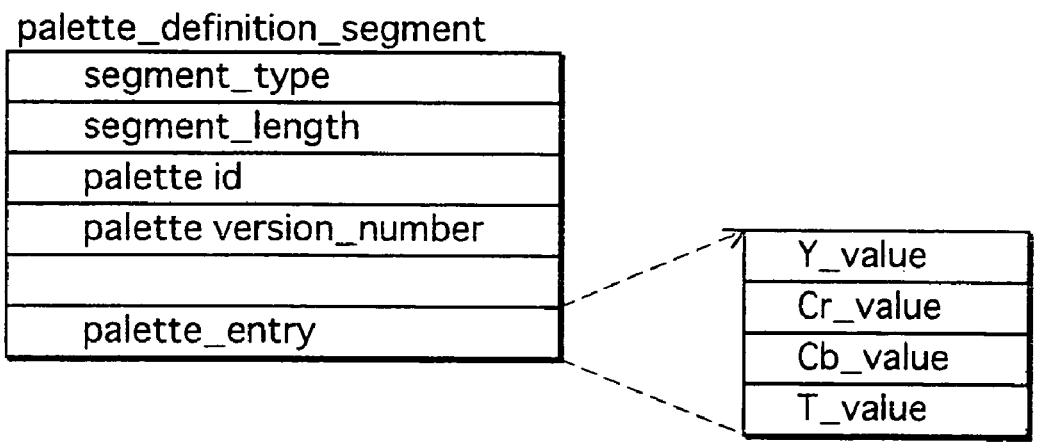
FIG. 7B shows a data structure of a PDS.

The Palette Definition Segment (PDS) is a functional segment for storing palette data. The palette data indicates combinations of Pixel Codes of 1 to 255 and pixel values. Each pixel value is composed of a red difference component (Cr value), a blue difference component (Cb value), a luminance component (Y value), and a transparency (T value). Each pixel code in the run length data is exchanged for a pixel value indicated by the palette to generate a color. The data structure of PDS is shown in FIG. 7B. As shown in FIG. 7B, the PDS includes a segment_type field indicating that the segment is of the PDS type, a segment_length field indicating a data length of the PDS, a palette_id field for uniquely identifying the palette included in the PDS, a palette_version_number field indicating a version of the PDS within the epoch, and a palette_entry field carrying information for each entry. The palette_entry field indicates a red difference component (Cr_value), a blue difference color component (Cb_value), a luminance component (Y_value), and a transparency (T_value) for each entry.

The following describes the WDS.

The window_definition_segment is a function segment that defines a rectangular area on the Graphics Plane. As described above, continuous memory management over an Epoch is only possible if clearing and rendering are limited to a fixed rectangular area on the Graphics Plane. The rectangular area on the Graphics Plane is called a "Window", and is defined by WDS. FIG. 8A shows the data structure of the WDS. As shown in FIG. 8A, the WDS is expressed using a window_id field uniquely identifying the Window on the Graphics Plane, a window_horizontal_position field indicating the horizontal position of a top left pixel on the Graphics Plane, and a window_vertical_position field indicating a vertical position of a top left pixel on the Graphics Plane, a window_width field indicating a width of the Window on the Graphics Plane, and a window_height field indicating a height of the Window on the Graphics Plane.

The window_horizontal_position field, the window vertical_position field, the window_width field, and the window_height field can contain the following values. The Graphics Plane serves as a coordinate system for these field values. Graphics Plane has a two-dimensional size defined by video_height and video_width parameters.

The window_horizontal_position field specifies a horizontal position of the top left pixel of the Window_on the Graphics Plane, and thus takes value in a range of 1 to the video_width. The window_vertical_position field specifies the vertical position of the top left pixel of the Window on the Graphics Plane, and thus takes a value in a range of 1 to the video_height.

The window_width field specifies the width of the Window on the Graphics Plane, and thus takes a value in a range of 1 to (video_width)−(window_horizontal_position). The window_height field specifies the height of the Window on the Graphics Plane, and thus takes a value in a range of 1 to (video_height)−(window_vertical_position).

A position and size of a Window can be defined for each Epoch using the window_horizontal_position, window_vertical_position, window_width, and window_height fields in the WDS. The author is therefore able to make adjustments to a Window at time of authoring to ensure that there is no interference with elements of the picture over the period of an Epoch. For instance, the Window may be made to appear in a desired margin. Subtitles displayed using graphics can be clearly viewed. Moreover, since it is possible to define a WDS for each epoch, the graphics can be moved as elements of the picture change with time. This enables a clear view of the graphics to be maintained. As a result, the quality of the movie product can be raised to the level of a cinema film, in which subtitles are integrated into the picture.

The following describes an END of Display Set Segment. The END of Display Set Segment is a functional segment indicating that transmission of a Display Set is complete, and is positioned immediately after the last ODS in the Display Set. The END of Display Set Segment includes a segment_type field indicating that the segment is of the END of Display Set type, and a segment_length field indicating a data length of the END of Display Set Segment. The END of Display Set Segment is not a main feature of the present invention. Thus, further description of the END of Display Set Segment is omitted.

The ODS, PDS, WDS and END are described above. The following describes the PCS.

The PCS is a functional segment for constituting an interactive screen. FIG. 8B shows a data structure of the PCS. As shown in FIG. 8B, the PCS includes a segment_type field, a segment_length field, a composition_number field, a composition_state field, a palette_update field, a palette_id_ref field, and composition_object fields (1) to (m).

The composition_number field identifies a graphics update in the Display Set, using a number from 0 to 15. Specifically, the composition_number field is incremented by one for each graphics update from the beginning of the Epoch to the PCS containing the composition_number field.

The composition_state field indicates whether the Display Set starting from the PCS is a Normal Case-type Display Set, an Acquisition Point-type Display Set, or an Epoch Start-type Display Sep.

The palette_update_flag field indicates whether the PCS describes a Palette-only Display Update. The Palette-only Display Update is an update that is limited to replacing the palette with a new palette. To indicate a Palette-only Display Update, the palette_update_flag is set to 1.

The palette_id indicates whether the PCS describes a Palette-only Display Update. The Palette-only Display Update is an update that is limited to replacing the palette with a new palette. To indicate a Palette-only Display Update, the palette_update_flag is set to 1.

The composition_object fields (1) to (m) each contain control information for realizing a screen composition using the Display Set to which the PCS belongs. In FIG. 8b, a composition_object (i) is expanded, as indicated by broken lines wd1, to illustrate an internal structure of the composition_object fields. As illustrated, the composition object(i) includes an object_id_ref, a window_id_ref, an object_cropped_flag, an object_horizontal_position, an object_vertical_position, and cropping_rectangle_information(1) to cropping_rectangle_information(n).

The object_id_ref field contains a reference value that is an object_id associated with a graphics Object. This reference value identifies the graphics Object that is to be used to produce a section of the screen composition corresponding to the composition_object(i).

The window_id_ref field contains a reference value that is a Window identifier (window_id). This reference value specifies the Window in which the graphics Object is to be displayed in order to produce the section of the screen composition corresponding to the composition_object(i).

The object_cropped_flag field indicates whether or not a graphics Object cropped in the Object Buffer is to be displayed. When the object_cropped_flag field is set to 1, the cropped graphics Object in the Object Buffer is displayed. When the object_cropped_flag field is set to 0, the cropped graphics Object in the Object Buffer is not displayed.

The object_horizontal_position field specifies a horizontal position of a top left pixel of the graphics Object on the Graphics Plane.

The object_vertical_position field specifies a vertical position of a top left pixel of the graphics Object on the Graphics Plane.

The cropping_rectangle information(1) to cropping rectangle information (n) fields are valid when the object_cropped_flag field is 1. The cropping_rectangle information (i) is expanded, as indicated by broken lines wd2, to illustrate an internal structure of the composition_rectangle information. As illustrated, the cropping_rectangle information(i) includes an object_cropping horizontal position field, an object_cropping_vertical position field, and object_cropping_width field, and an object_cropping_height field.

The object_cropping_horizontal position field specifies a horizontal position of a top left corner pixel of a cropping rectangle in the graphics Object. The cropping rectangle is used to remove a portion of the graphics Object, and corresponds to a "region" in the ESTI EN 300 743 standard.

The object_cropping_vertical position field specifies a vertical position of the top left corner pixel of the cropping rectangle on the Graphics Object.

The object_cropping_width field specifies a width of the cropping rectangle in the Graphics Object.

The object_cropping_height field specifies a height of the cropping rectangle in the Graphics Object.

Figure 9:
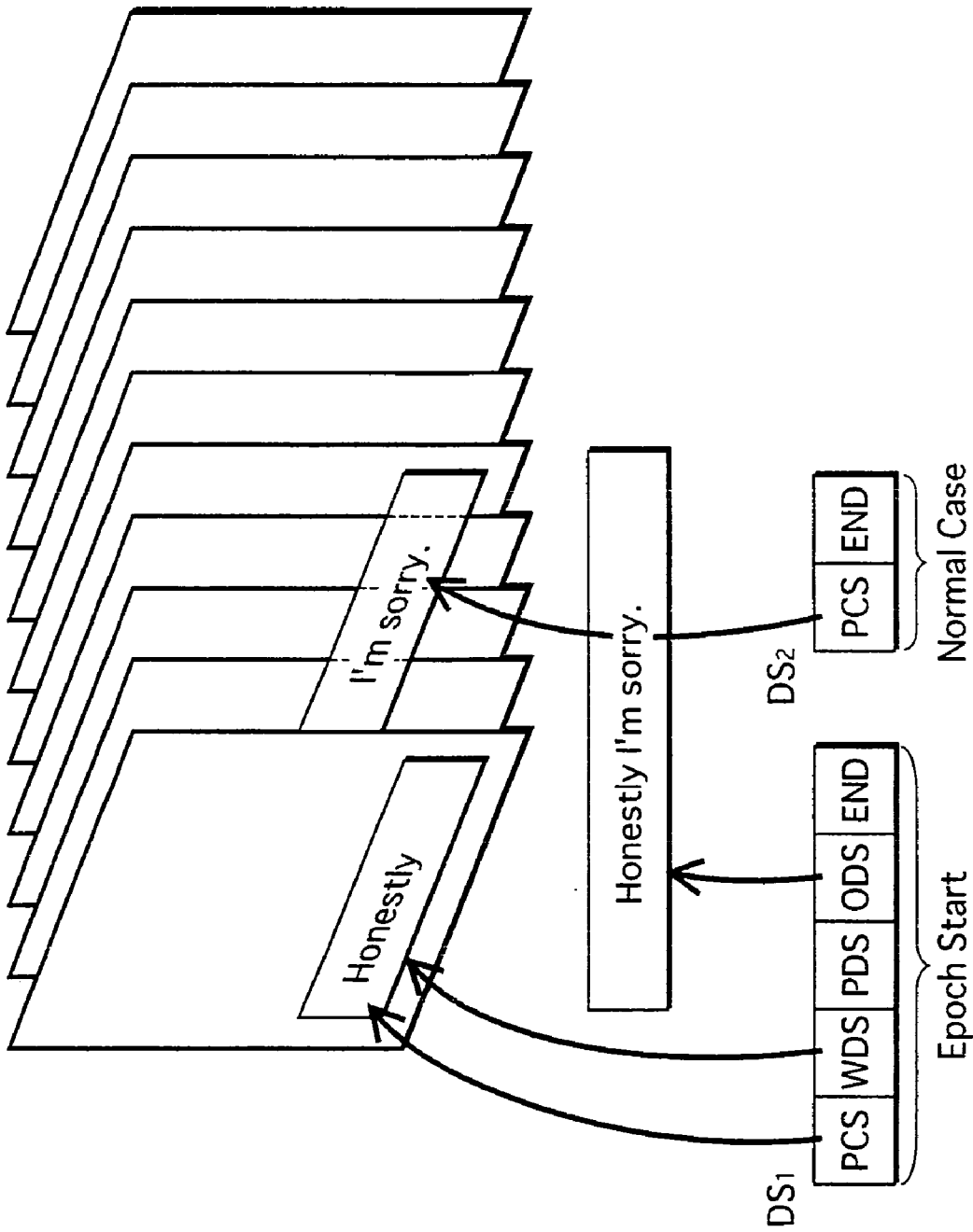
FIG. 9 illustrates an example of how subtitles are realized.

The data structure of the PCS is described above. The following describes a specific example of the PCS. In the example, the subtitles "Honestly" and "I'm sorry" shown in FIG. 6 are displayed in sequence by writing to the graphics plane three times as the moving picture is reproduced. FIG. 9 illustrates how the subtitles are realized. In FIG. 9, an Epoch includes DS1 (Epoch Start) and DS2 (Normal Case). The DS1 includes a WDS defining a window in which the subtitles are to be displayed, an ODS including the line "Honestly, I'm sorry", and a first PCS. The DS2 includes a second PCS.

Figure 10:
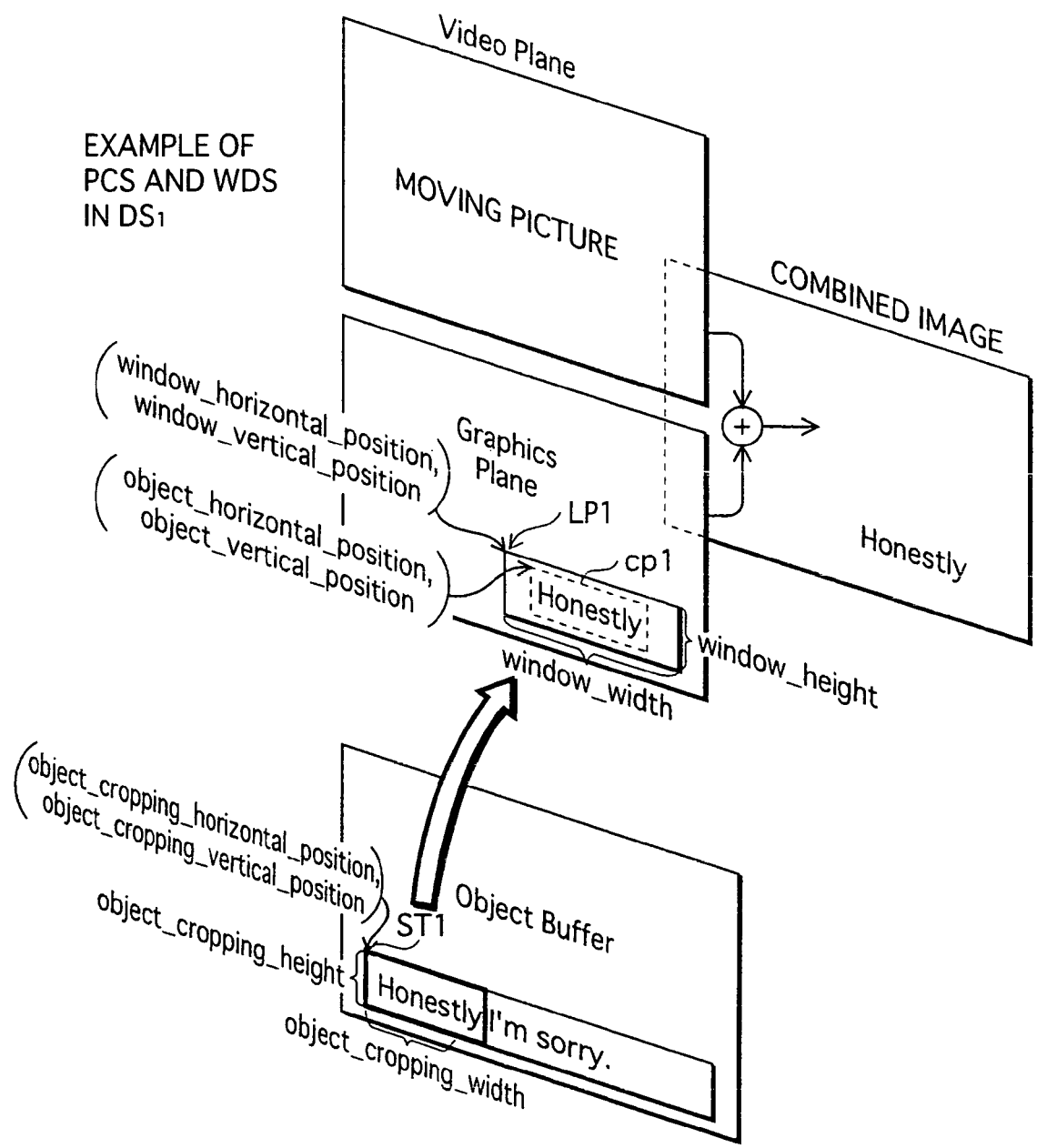
FIG. 10 shows an example of a PCS in a DS1.
Figure 11:
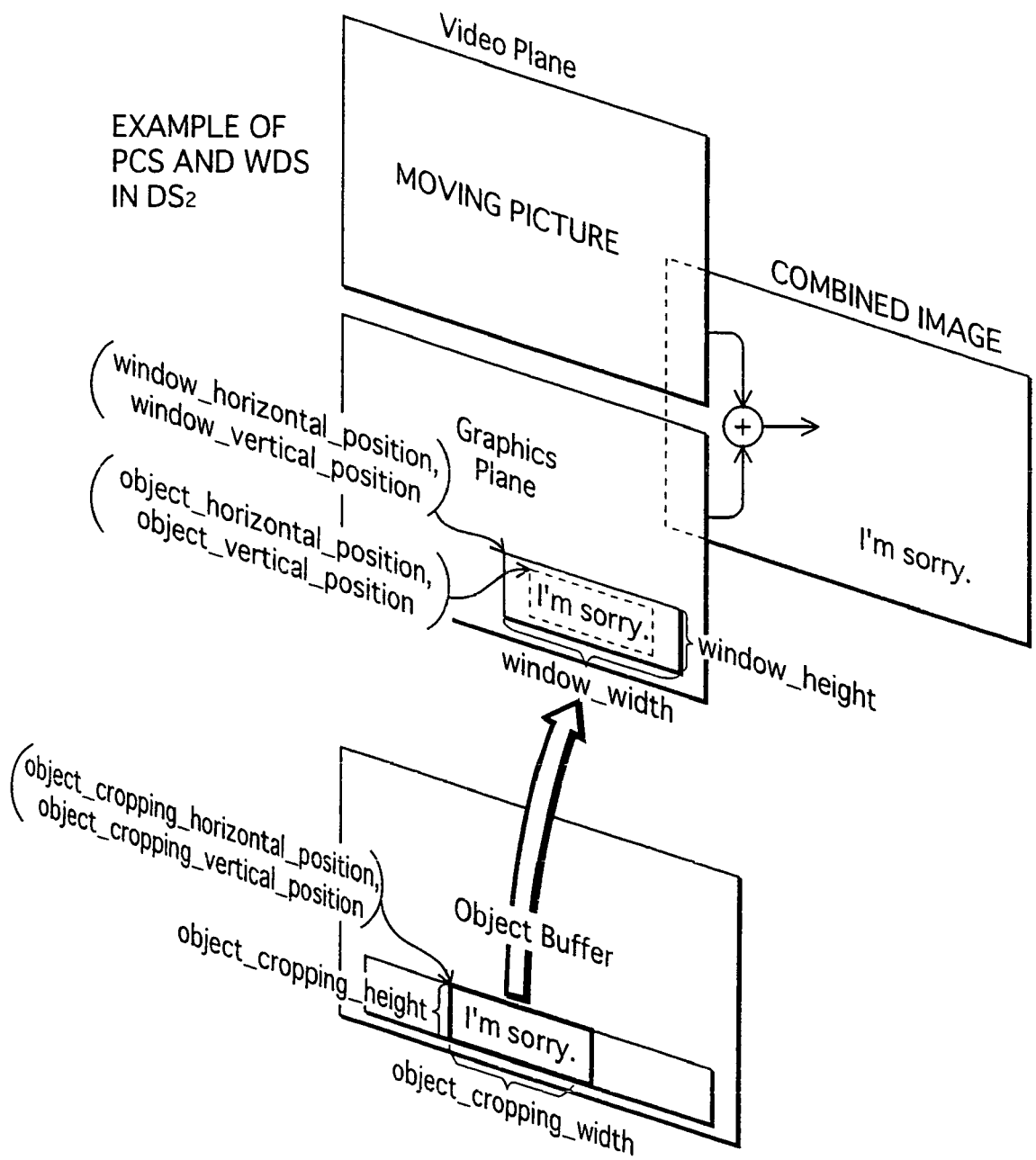
FIG. 11 shows an example of a PCS in a DS2.
Figure 12:
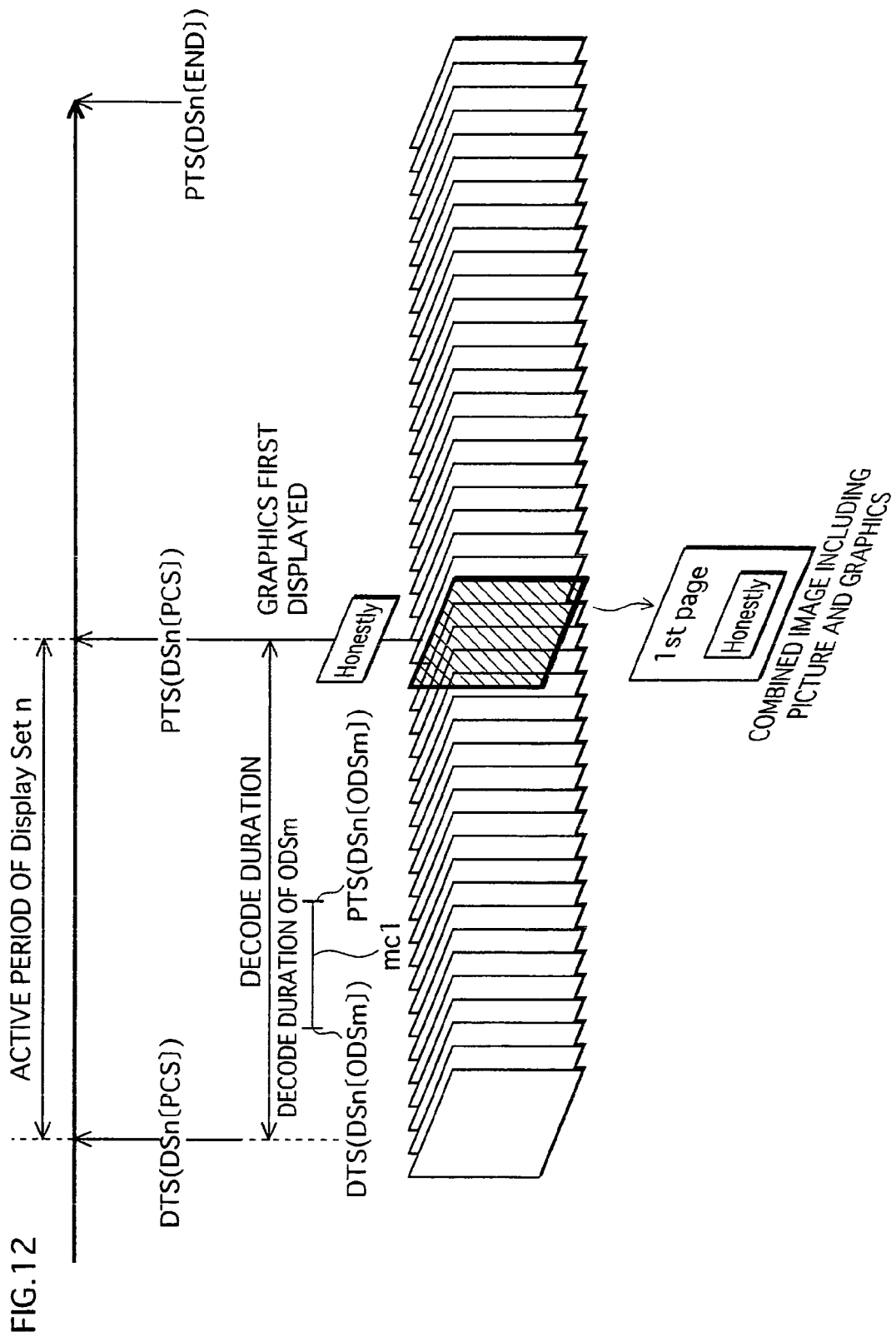
FIG. 12 shows a playback time axis of an AV Clip to which a DSn is allocated.

The following describes each PCS. FIGS. 10 to 12 show examples of the WDS and PCS. FIG. 10 shows the PCS in DS1.

In FIG. 10, a window_horizontal_position field value and a window_vertical field value in the WDS specify top left coordinates LP1 of the Window on the Graphics Plane, and a window_width field value and a window_height field value in the WDS specify a height and width of the Window.

In FIG. 10, an object_cropping_horizontal_position field value and a window_vertical_position field value specify a basepoint ST1 of a cropping rectangle in a coordinate system whose origin is the top left of the of the Graphics Object in the Object Buffer. The cropping rectangle (enclosed by a thick line) is then defined using an object_cropping_height field value, an object_cropping_width field value and the basepoint ST1. The cropped graphics Object is then disposed in a region cp1 (enclosed by a broken line) so that a top left corner of the cropped Graphics Object lies at a pixel specified by an object_horizontal_position field value and an object_vertical position field value in the coordinate system of the Graphics Plane. This causes "Honestly" to be written into the window of the graphics plane. Consequently, the subtitle "Honestly" is displayed in combination with the moving picture.

FIG. 11 shows the PCS in DS2. Since the WDS inn FIG. 11 is the same as that of FIG. 10 its description is omitted. The cropping rectangle in FIG. 11, however, differs from that of FIG. 10. An object_cropping_horizontal_position and an object_cropping_vertical_position specify top left coordinates of a cropping rectangle corresponding to "I'm sorry" from the line "Honestly I'm sorry", and the object_cropping_height and object_cropping_width specify a height and width of the cropping rectangle corresponding to "I'm sorry". This causes "I'm sorry" to be written into the Window on the Graphics Plane. Consequently, the subtitle "I'm sorry" is displayed in combination with the moving picture.

The functional segments are described above. The following describes the manner in which Display Sets including PCSs and ODSs are allocated to the playback time axis of the AV Clip. An Epoch is a period on the playback time axis over which memory management is continuous, and each Epoch constitutes one or more Display Sets. At issue, therefore, is the manner in which the one or more Display Sets are allocated to the playback time axis. Note that the playback time axis is an assumed axis used to prescribe decoded timings and playback timings for each frame of picture data making up the video stream that is multiplexed into the AV Clip. The decode timing and playback timing are expressed to an accuracy of 1/90000 seconds. The DTS and PTS associated with the PCS and ODS in the Display Set specify timings for synchronous control on the playback time axis. In other words, the DSs are allocated to the playback time axis by carrying out synchronous control using the DTSs and PTSs associated with the PCSs and ODSs.

A Display Set DSn of the Display Sets belonging to the Epoch is allocated to the playback time axis using a PTS and DTS which are set as shown in FIG. 12. FIG. 12 shows the AV Clip playback time axis to which the DSn has been allocated. In FIG. 12, the start of the DSn period is specified by a DTS value (DTS(DSn[PCS]) of a PCS belonging to the DSn, and the end of the period is specified by a PTS value (PTS(DSn [PCS])) of the same PCS. The timing for the first display is also specified by the PTS value (PTS(DSn[PCS]) if the PCS. If the timing of a desired picture in a video stream is matched with the PTS(DSn[PCS]), first display of the DSn will synchronize with the video stream.

The PTS(DSn [PCS]) is a value obtained by adding DTS{DSn PCS}) a period for decoding ODS (DECODEDURATION) to the DTS(DSn[PCS]).

Decoding necessary for the first display of the DSn is performed in the DECODEDURATION. In FIG. 12, a period mc1 is a period during which an arbitrary ODS(ODSm) belonging to the DSn is decoded. The starting point of the decode period mc1 is specified by DTS (ODSn [ODSm]), and the end point of the decode period mc1 is specified by PTS (ODSn[ODSm]).

The Epoch is therefore prescribed by allocating each of the ODSs in the Epoch to the playback time axis. The above describes the allocation to the playback time axis.

The Epoch is a unit over which memory management in the graphics decoder is continuous. Thus, it is normally necessary that the Epochs finish within a single AV Clip. However, when two AV Clips are played back in sequence and three prescribed conditions are met, it is possible to define an Epoch that is continuous over the boundary between the AV Clips.

Figure 13:
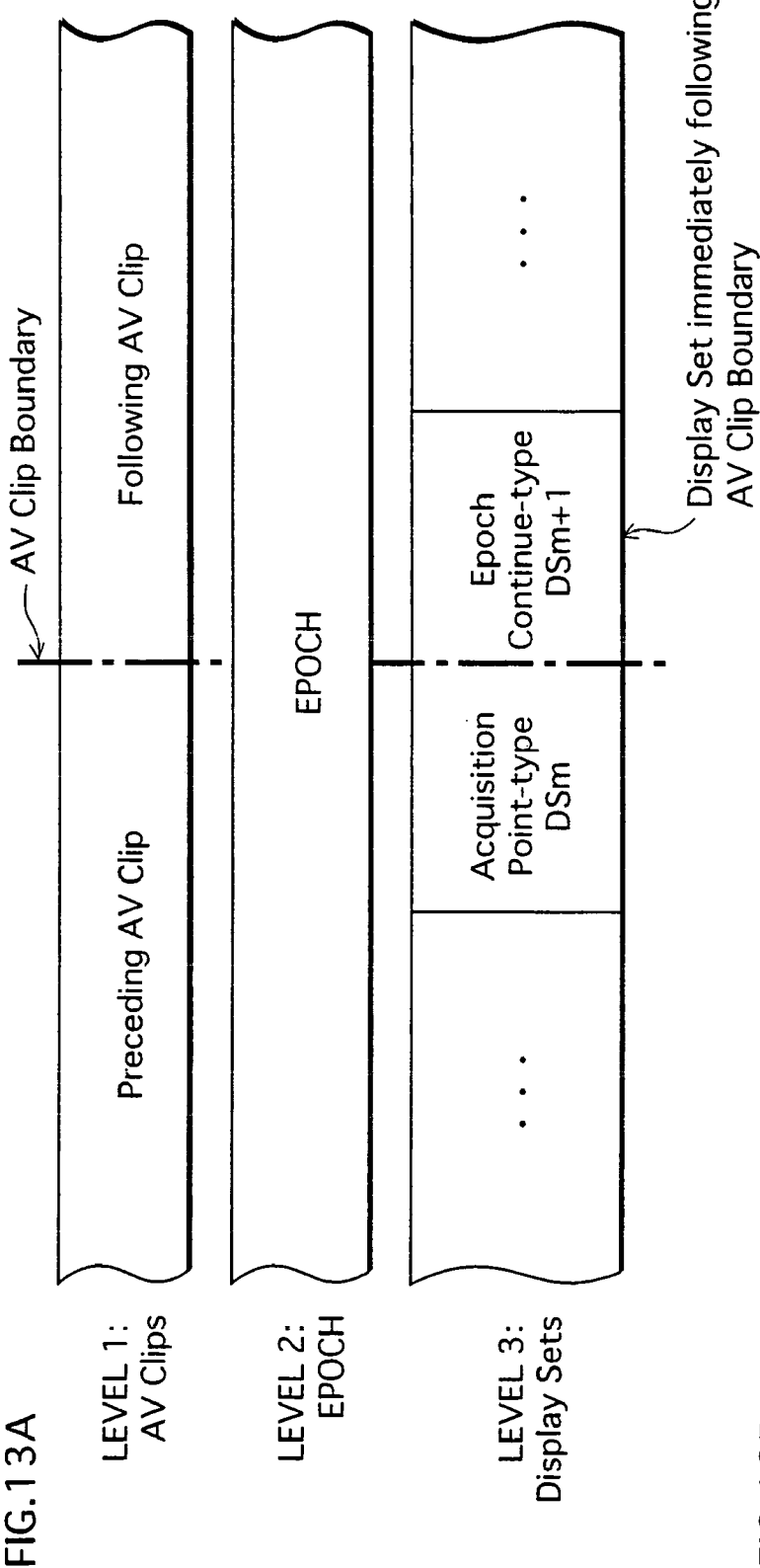
FIG. 13A shows an Epoch that has continuity between two AV clips.
FIG. 13B shows how Display Sets of an Epoch Continue type are managed.

FIG. 13A shows an Epoch that is continuous across a boundary between two AV Clips. Level 1 in FIG. 13A shows the two AV Clips that are to be played back consecutively. Level 2 shows an Epoch that is continuous across a boundary between the two AV Clips. Level 3 shows the Display Sets that belongs to the Epoch in level 2. The Epoch shown in level 2 is not divided at the boundary between AV Clips. In the Display Sets in level 3, however, there is a boundary between the Display Sets at the boundary between the AV Clips. Note that in FIG. 13A the Display Set (DSm+1) positioned immediately after the boundary between the AV Clips is of an Epoch Continue type.

Epoch Continue refers to the type of the Display Set (DSm+1) positioned immediately after the boundary between the AV Clips. The Display Set (DSm+1) is treated as an Acquisition Point if the three prescribed conditions are met, and an Epoch Start if one or more of the three conditions is not met.

FIG. 13B shows the manner in which display a Display Set of the Epoch Continue type is treated. As is clear from FIG. 13B, the Display Set of the Epoch Continue type is treated as an Epoch Start in the case of skip playback from a subsequent AV clip, and as an Acquisition Point in the case of consecutive playback from the immediately preceding AV Clip.

Figure 14:
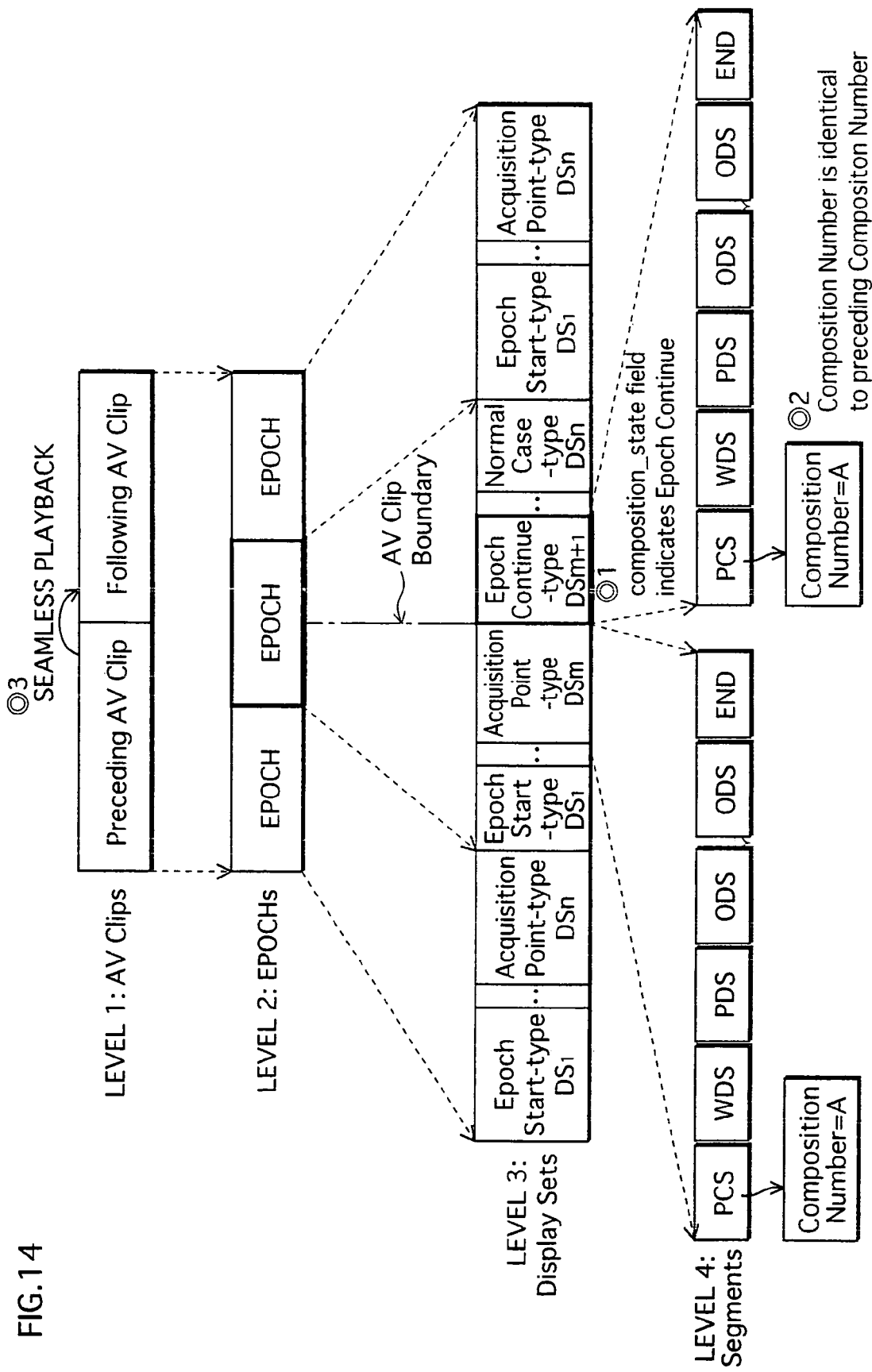
FIG. 14 shows three conditions necessary for continuity between two AV Clips.

FIG. 14 shows the conditions for ensuring continuity between the two AV Clips. Level 1 in FIG. 14 shows two AV Clips that are to be played back consecutively and level 2 shows three Epochs. Of these three Epochs, the middle Epoch is the one in which memory management is continuous across the boundary between the two AV Clips. Level 3 shows Display Sets that belong to respective Epochs. The Epochs in level 2 have boundaries that differ in position from the boundaries of the AV Clips. Level 4 shows the functional segments that belong to each Display Set. The group of functional segments in level 4 is the same as that in level 4 of FIG. 5. The symbols double circle 1, double circle 2, and double circle 3 in FIG. 14 indicate the conditions for establishing an Epoch with continuity across the boundary between the two AV Clips. The first condition is that the Display Set (DSm+1) positioned immediately after an AV Clip Boundary is of the Epoch Continue-type.

Figure 15:
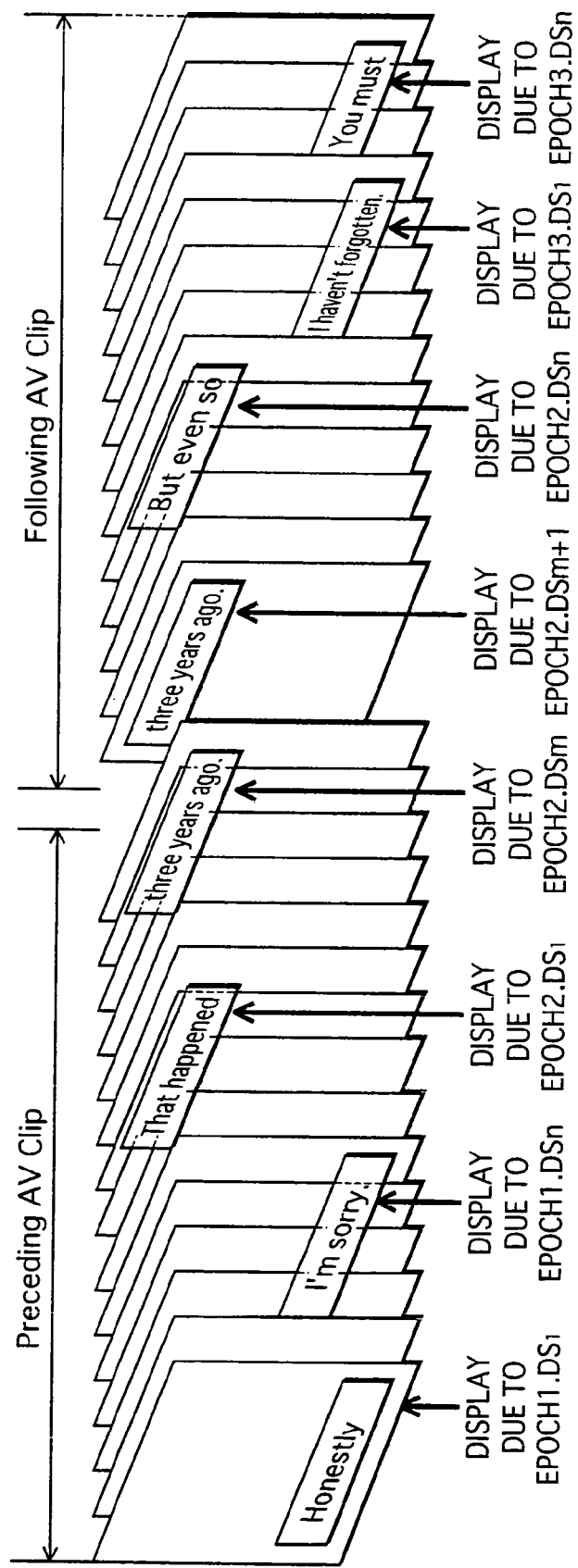
FIG. 15 shows a screen composition for DSm and a screen structure DSm+1 for comparison.
Figure 16:
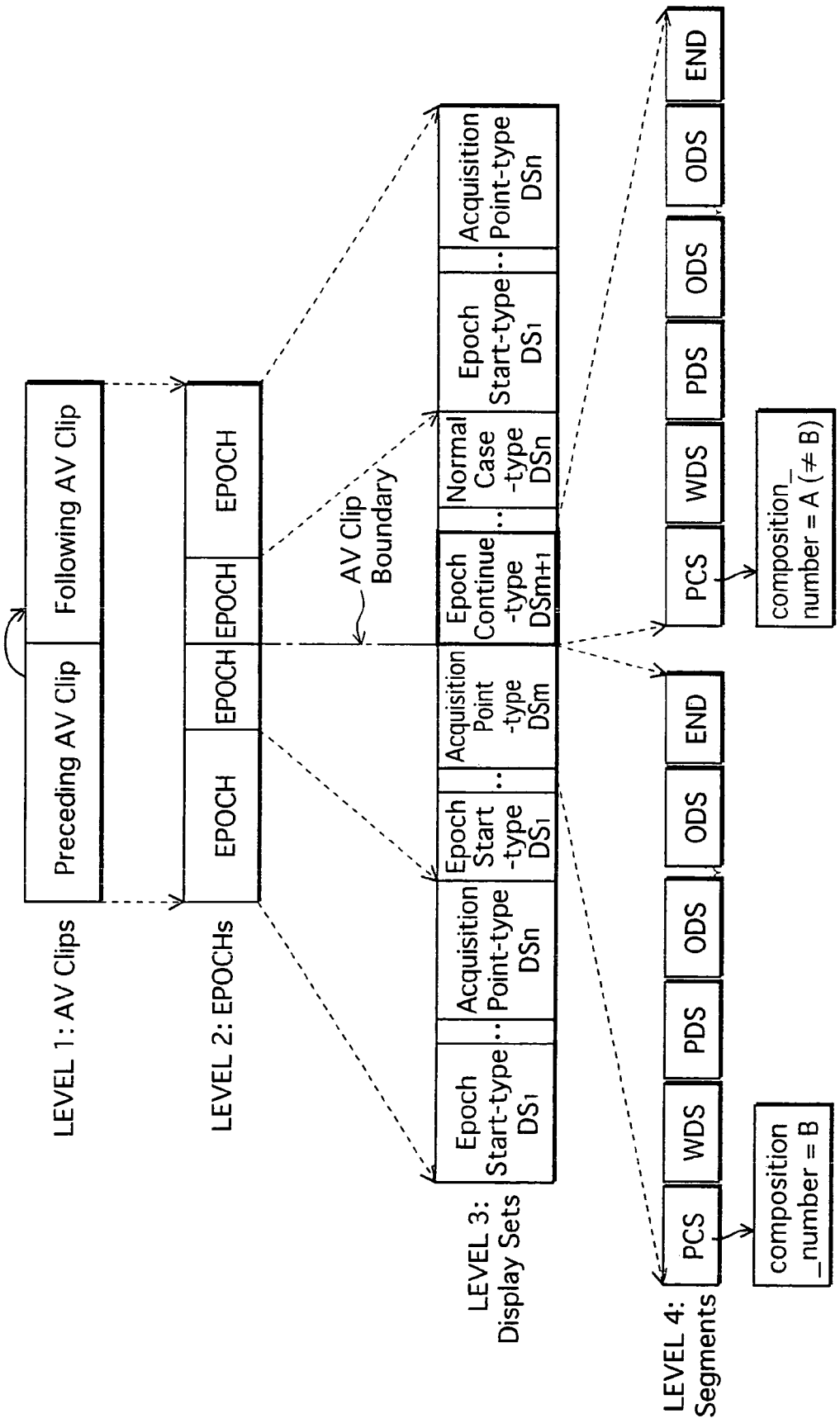
FIG. 16 shows an Epoch divided into two parts at a boundary between AV Clips.

The second condition is that a composition_number in a PCS belonging to the DSm+1 is identical to a-composition_number (=A) in a PCS belonging to the DSm, which immediately precedes the DSm+1 (i.e. the content of the graphics is the same before and after the boundary between the two AV clips). The composition_number refers to a screen composition that uses the Display Set. Thus, if the composition_numbers in the DSm and DSm+1 are equal, the graphics obtained using screen compositions corresponding to these Display Sets are the same. FIG. 15 shows the screen composition of DSm and the screen composition of DSm+1 for comparison. As shown in FIG. 15, the graphics corresponding to the DSm are "three years ago", and the graphics corresponding to the DSm+1 are also "three years ago". Thus, the graphics produced by the two display sets are identical, and it is clear that the Composition_numbers will be identical. Also, since the video streams are played back seamlessly, the DSm+1, it is clear that the DSm+1 will be treated as an acquisition point.

The third condition is that playback of the AV Clip and the immediately following AV Clip is seamless. Seamless playback of the video stream is conditional upon the following.

(i) The display method (e.g. NTSC, PAL) for the video stream, which is specified by attribute information, is the same in both AV Clips.

(ii) The encoding method (e.g. NTSC and PAL) for the audio stream, which is specified by the attribute information, is the same in both AV Clips.

If, in (i) and (ii), the display methods and encoding methods for the video and audio streams are different, seamless playback cannot be performed because the video decoder and audio decoder stop operating momentarily in order to switch to new display format, encoding mode and bit rate.

For example, when two audio streams are to be played back consecutively and one is encoded using the AC-3 method and the other using an MPEG standard, the audio decoder stops decoding momentarily between the two streams in order to carry out an internal switch of attributes. The case when the video streams are different is similar.

Seamless playback, therefore, only takes place when the conditions of (i) and (ii) are satisfied. If any of the above conditions is not satisfied, seamless playback is not permitted.

If the three conditions are met, the DSm+1, which is of the Epoch Continue type, is treated as an Acquisition Point. In other words, the Display Sets 1 to m and the Display Sets m+1 to n form a single Epoch, and the state of the buffer in the Graphics decoder is maintained when two AV clips are played back consecutively.

Figure 17:
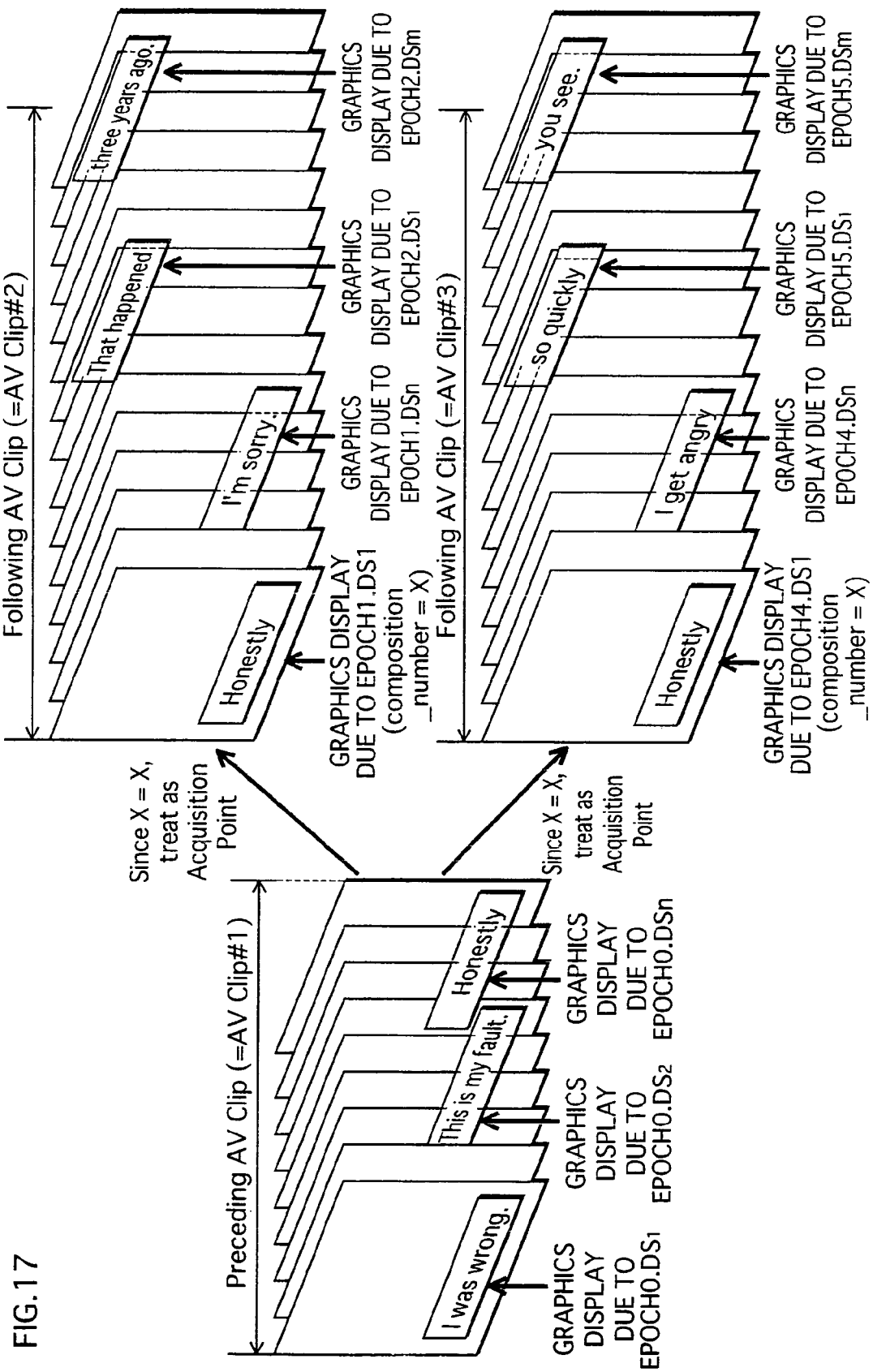
FIG. 17 shows how an Epoch Continue is managed at a branch point when two AV Clips (AV Clip #2 and AV Clip #3) are available to follow a single AV Clip (AV Clip #3)

Note that, even if the DSm+1 is of the Epoch Continue type, in the case that one or both of the remaining conditions are unsatisfied, the Epoch will be divided at the boundary between the AV Clips. From the above it is clear that the Display Set of the Epoch Continue type is only treated as an Acquisition Point if the three conditions are satisfied. If any one or more of the conditions is not satisfied, the Display Set of the Epoch Continue type is treated as an Epoch Start. FIG. 17 shows the manner in which an Epoch Continue type Display Set is managed when there are two preceding AV Clips (AV Clip#2 and AV Clip#3) for a given AV Clip (AV Clip#1). Of the two types of preceding AV Clip, AV Clip#1 is of the type shown in FIG. 14. The AV Clip#2 that is to follow the AV Clip#1 is also of the type shown in FIG. 14. The AV Clip#1 and the AV Clip #2 therefore satisfy all three of the conditions. Thus, when played back after AV Clip#1, the first DS (DSm+1) in AV Clip#2 is treated as an Epoch Continue. The other following AV Clip, which is the AV Clip#3, has exactly the same graphic content as the AV Clip#2. Also, the composition_number in the last DS (DSn) of AV Clip#1 matches the composition_number in the first AV Clip#3. Therefore, when AV Clip#3 follows AV Clip#1, all three conditions are satisfied, and the Epoch Continue type Display Set is treated as an Acquisition point.

Figure 18:
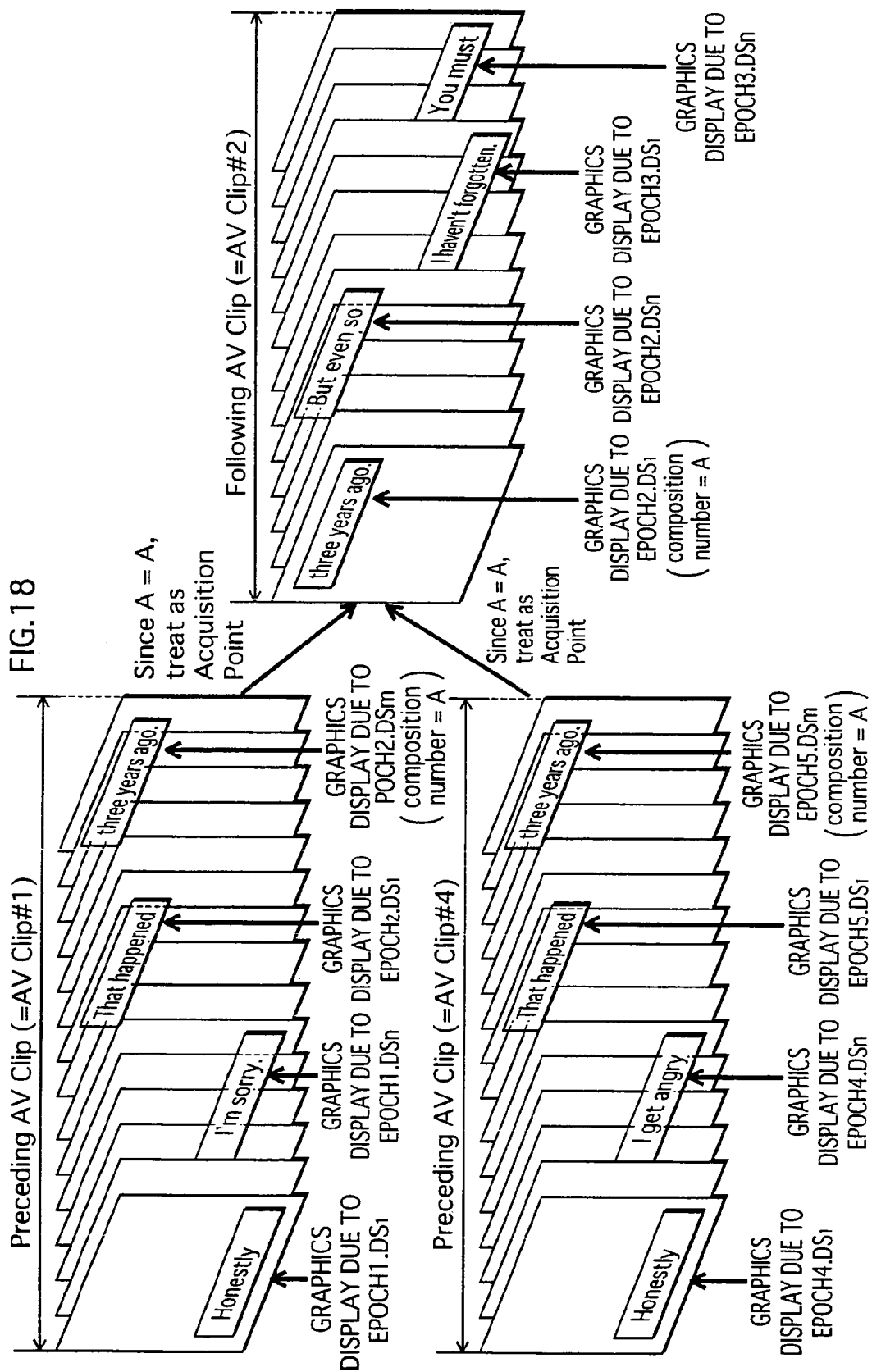
FIG. 18 shows how an Epoch Continue is managed at a point where two preceding AV Clips (AV Clip #1 and AV Clip #4) merge to a single AV Clip (AV Clip#2)

FIG. 18 shows how an Epoch Continue is managed at a merge point when two preceding AV Clips (AV Clip #1 and AV Clip #4) merge to a single AV Clip (AV Clip#2). Both AV Clip#1 and AV Clip#2 are of the type shown in FIG. 14, and satisfy the three conditions. Thus, in the case that AV Clip#1 is played back first, the first DS (DS1) in AV Clip2 will be treated as an Epoch Continue. The AV Clip#4 has exactly the same graphic content as the AV Clip#1. Also, the composition_number in the in the last DS (DSm) of AV Clip#4 matches the composition_number in the first DS (DS1) of the AV Clip#2. Thus, in the case that the order of playback is AV Clip#4 to AV Clip#2, the three conditions are satisfied, and the Epoch Continue type Display Set is treated as an Acquisition Point.

Figure 19:
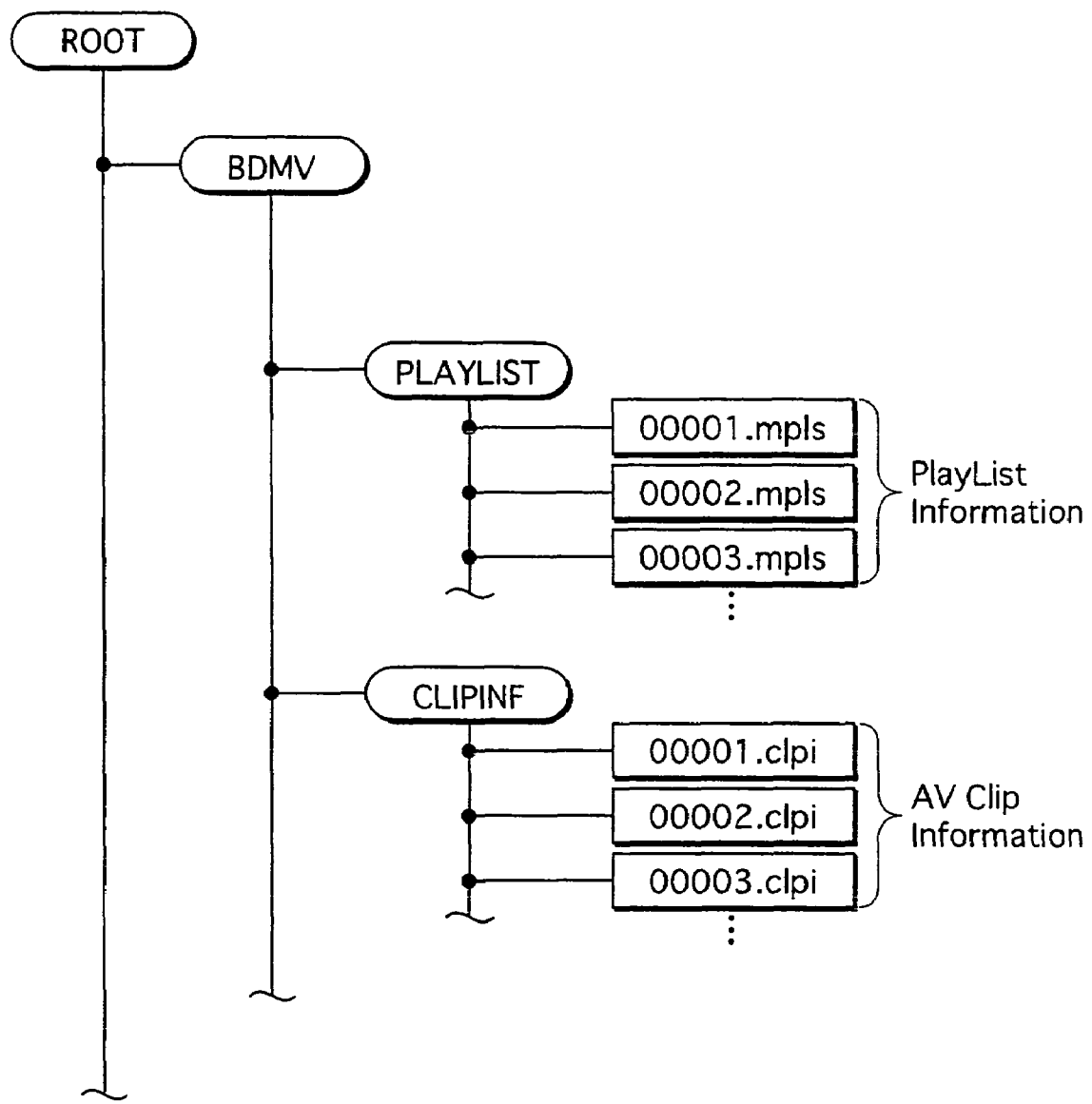
FIG. 19 shows files having an extension "clpi" and files having an extension "mpls"

The above describes the AV Clip. The following describes files having the file extensions "clpi" and "mpls". FIG. 19 shows files having the extension "clpi" and files having the extension "mpls".

The files having the file extensions' (0001.cpli, 0002.cpli, 0003.cpli . . . ) are pieces of management information in one to one correspondence with the AV clips. The pieces of management information include information such as coding format of the AV Clips in the stream, a frame rate, a bit rate, and a resolution. Each piece of management information also has an EP-Map and an ATC_Delta for indicating the head position of a GOP. The ATC (Arrival Time Clock) in ATC_Delta refers to a clock signal used a reference for the ATS. The ATC_Delta indicates the difference between the ATC of the preceding AV Clip and the ATC of the following ATC Clip.

Figure 20:
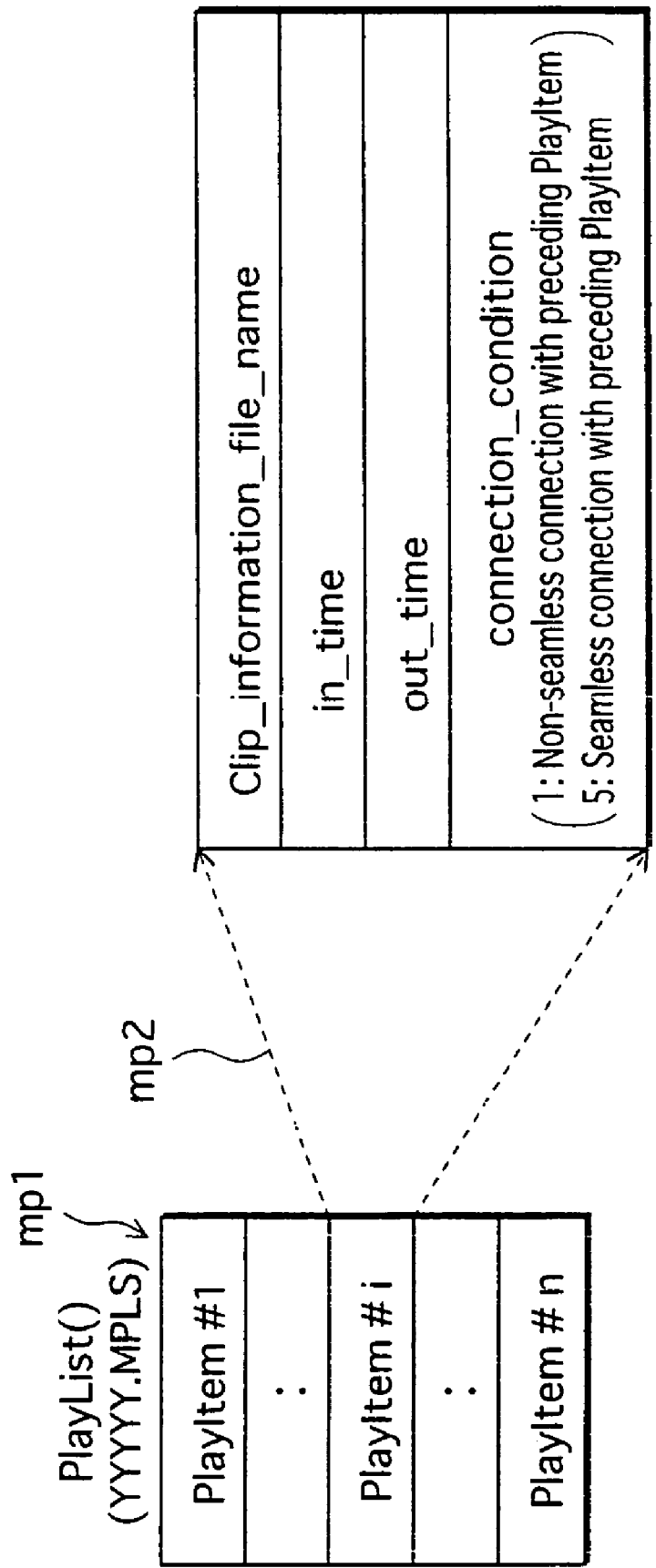
FIG. 20 shows a structure of a piece of PL information.

The files having the extension "mpls" (0001.mpls, 0002.mpls, 0003.mpls . . . ) store pieces of PL information. Each piece of PL information defines a playlist by reference to the AV Clips. FIG. 20 shows a composition of PL information. As shown on the left side of FIG. 19, marked by mp1, each piece of PL information is composed of a plurality of pieces of PlayItem information each denoted as (PlayItem( )). The PlayItem is a playback section defined by specifying an in_time and an out_time on one or more AV Clip time axes. A PlayList (PL) composed of a plurality of playback sections is then defined by providing a plurality of pieces of Play Item information. The broken lines marked mp2 in FIG. 20 point indicate a close up of a composition of one piece of PlayItem information. As shown in FIG. 20, each piece of PlayItem information is composed of a clip_information_file_name field, an in_time field, an out_time field, and a connection_condition field.

Figure 21:
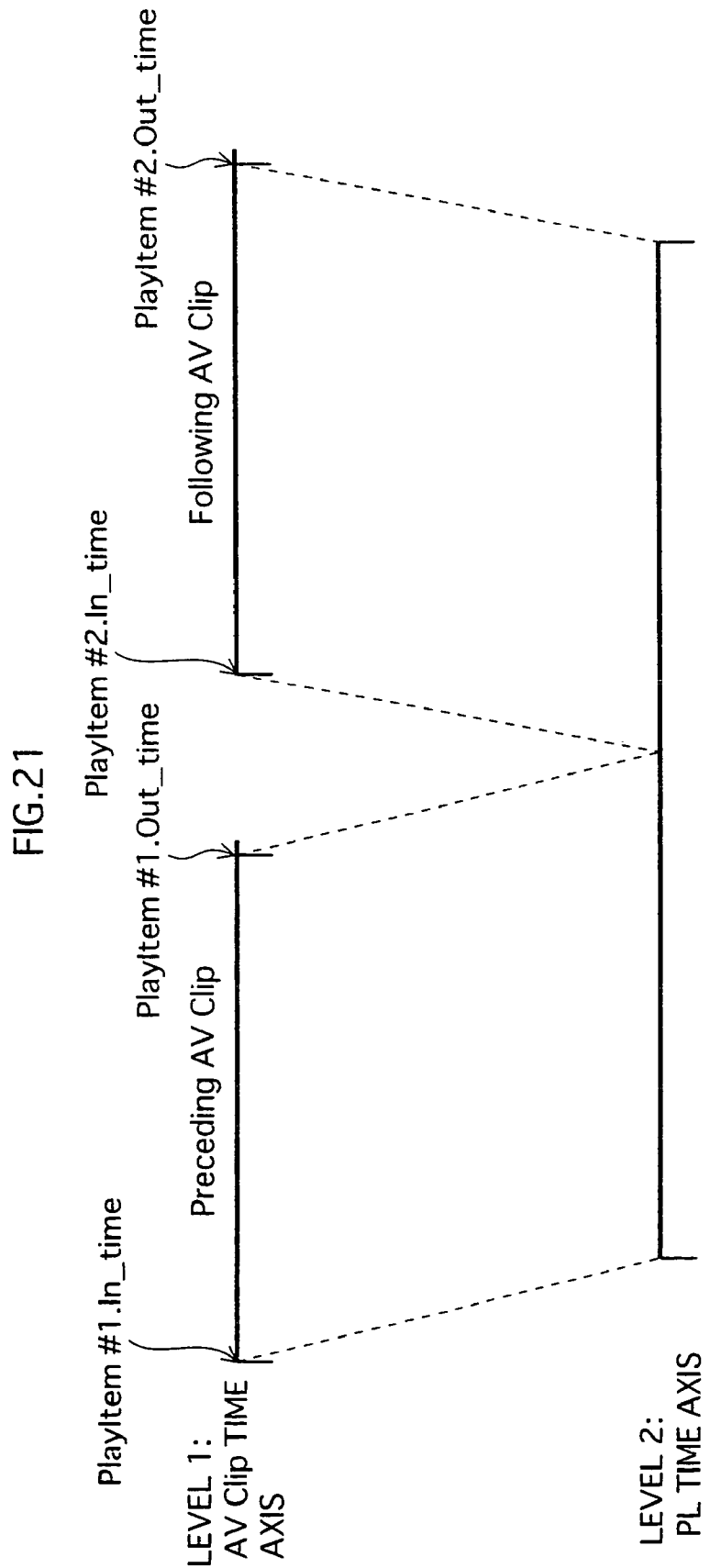
FIG. 21 shows an example of pieces of PL information in the case where two AV Clips are to be managed as a single PlayList.

Settings in a piece of PL information when two AV Clips are treated as a single PlayList are described with reference to FIG. 21. Level 1 in FIG. 21 shows the two AV Clips of FIG. 15. Level 2 in FIG. 21 shows the PlayList playback time axis defined by the corresponding piece of PL information. The piece of PL information includes two pieces of PlayItem information (PlayItem#1 and PlayItem#2). The preceding AV Clip and following AV Clip are treated as a single PlayList if the in_time field and the out_time field of PlayItem#1 indicate the start point and the end point of the preceding AV Clip and the in_time field and the out_time field of PlayItem#2 indicate the start point and the end point of the following AV Clip. Level 2 in FIG. 21 shows a playback time axis (PL Playback Time Axis) of the Playlist defined by the piece of PL information. When the PlayList is defined in this way, the AV Clip is treated, in a sense, as a section of the PlayList. Each section of the PlayList is called a PlayItem. In other words, the relationship PlayItem=AV Clips holds true.

In the piece of PlayItem information that defines a PlayItem, there is a connection_condition field, which indicates whether or not whether playback of the corresponding PlayItem is to seamlessly follow playback of the preceding PlayItem (AV Clip).

Figure 22:
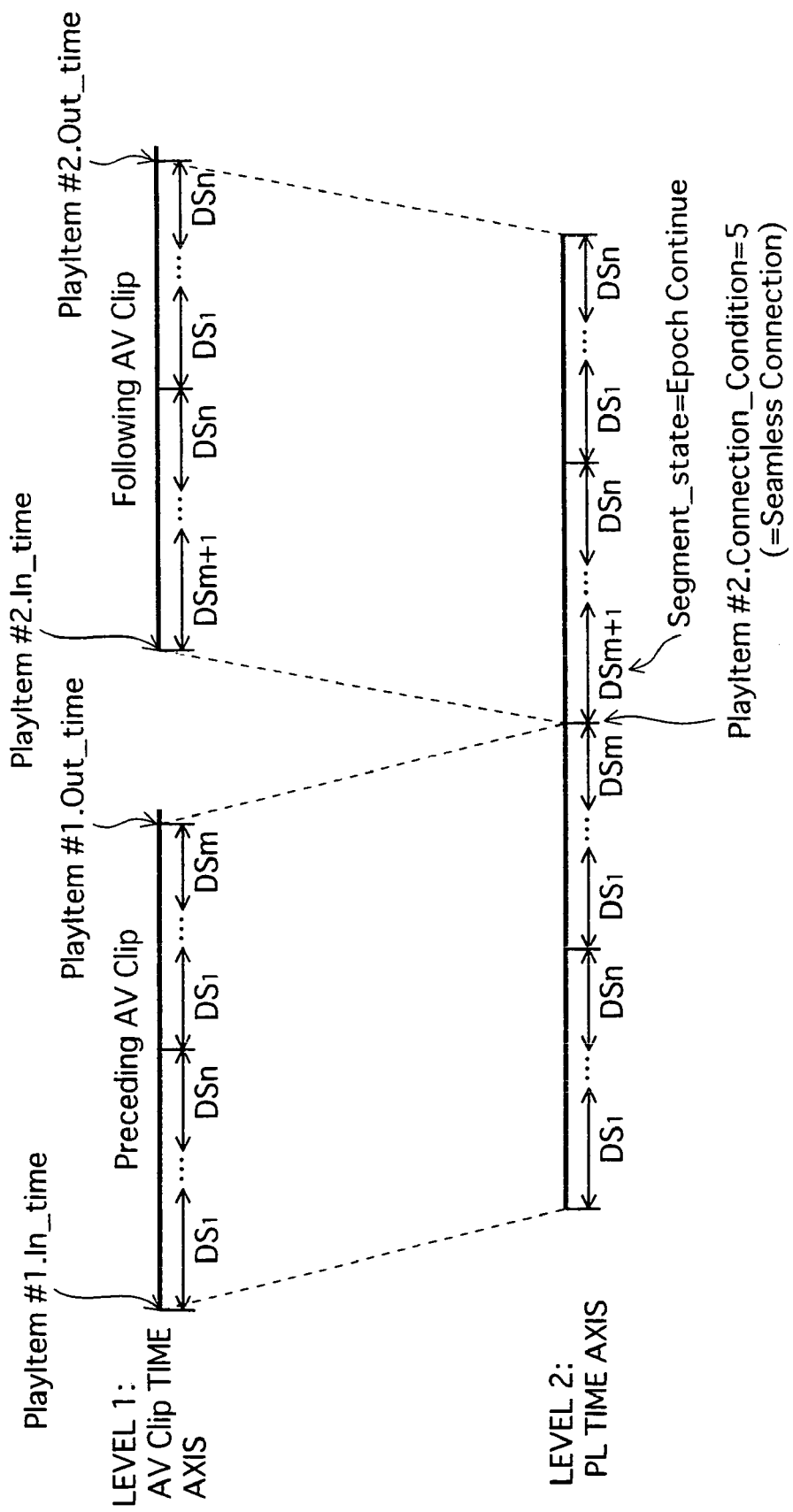
FIG. 22 shows a Display Set belonging to each PlayItem (AV Clip), and the connection_condition of each PlayItem.
Figure 23:
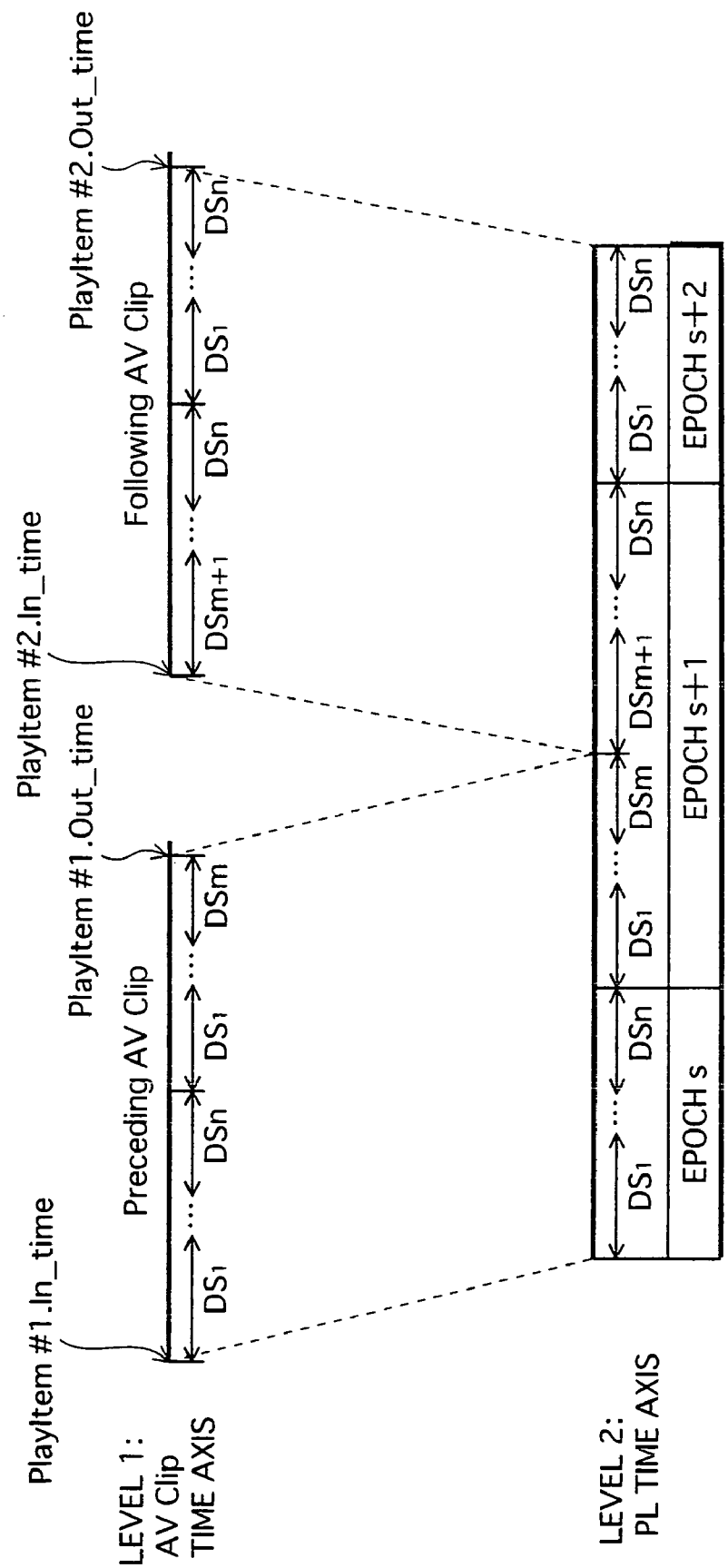
FIG. 23 shows an Epoch that contains DSm+1 at the head of PlayItem#2 (a following AV Clip), and DSm at an end of PlayItem#1.

FIG. 22 shows Display Sets belonging to each PlayItem (AV Clip), and the connection_condition field of each PlayItem. In FIG. 22, if the Display Set (DSm+1) at the head of PlayItem#2 is of the Epoch Continue type, and the connection_condition field in the PlayItem#2 indicates a seamless connection, the DSm+1 at the head of the PlayItem#2 (the following AV Clip) and the DSm at the end of the PlayItem#1 (the preceding AV Clip) belong to a same Epoch. FIG. 23 shows the Epoch containing the DSm+1 at the head of the PlayItem#2 (the following AV Clip) and the DSm at the end of the PlayItem#1 (the preceding AV Clip). Since the last Display Set in the preceding AV Clip and the first Display Set of the following AV Clip belong to the same Epoch, the graphics display resulting from these two Display Sets will be continuous.

Figure 24:
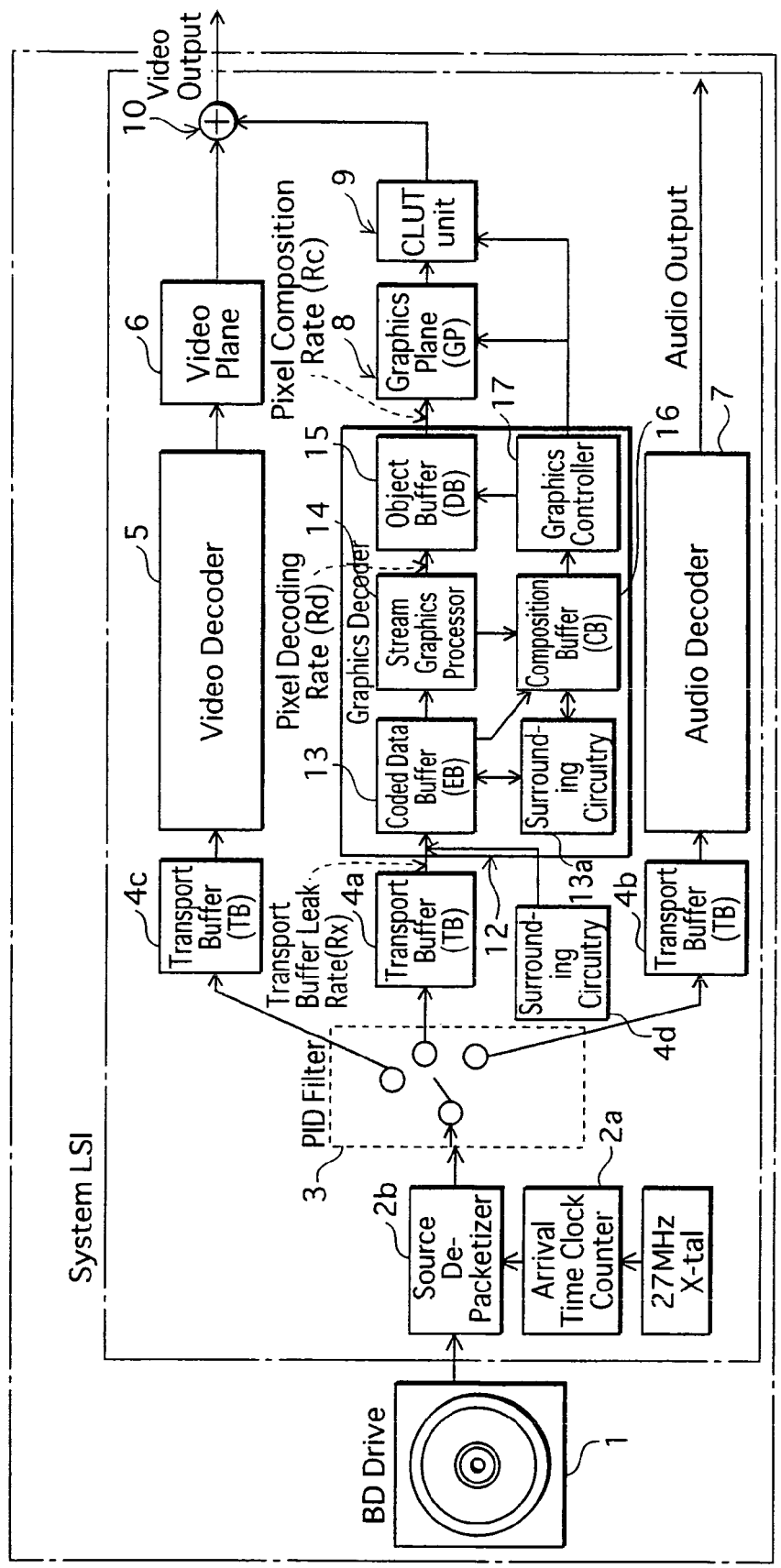
FIG. 24 shows an internal structure of a reproduction device of the present invention.

The above-described data structures of the Display Sets (PCS, WDS, PDS, and ODS) are instances of class structures described in programming language. A producer authoring a BD-ROM is able to obtain such data structures on the BD-ROM by describing a desired class structure using syntax stipulated by a Blu-ray Disc Read Only Format. The above describes the recording medium of the embodiments of the present invention. The following describes the reproduction device of the embodiments of the present invention. FIG. 24 shows an internal structure of the reproduction device of the present invention. The reproduction device of the present invention is commercially produced with an internal structure based on that shown in FIG. 24. The reproduction device of the present invention is mainly composed of three parts, these being system LSI, a drive device, and a microcomputer system, and can be commercially produced by equipping a base and cabinet with these parts. The system. LSI is an integrated circuit including various processing units each with a reproduction device-related function. Reproduction devices produced in this way are constructed from a BD drive 1, and arrival time clock counter 2a, a source de-packetizer 2b, a PID filter 3, Transport Buffers 4a, 4b and 4c, surrounding circuitry 4d, a video decoder 5, a video plane 6, an audio decoder 7, a graphics plane 8, a CLUT unit 9, an adder 10, a graphics decoder 12, a coded data Buffer 13, a surrounding circuitry 13a, a stream graphics processor 14, an object buffer 15, a composition buffer 16, and a graphics controller 17.

The BD-ROM drive 1 loads/ejects BD-ROMs, accesses a loaded BD-ROM, and from the loaded BD-ROM, reads an aligned unit composed of 32 sectors.

The arrival time clock counter 2a generates an arrival time clock based on a 27 MHz liquid crystal oscillator. An Arrival Time Clock is a clock signal providing a time axis used as a reference for the ATS attached to the TS packets.

When the Aligned Unit composed of the 32 sectors is read from the BD-ROM, the source de-packetizer 2b extracts a TP_extra_header from each of the TS packets that constitute the Aligned Unit, and outputs the stripped TS packets to the PID filter 3. Output of each stripped TS packet to the PID filter 3 takes place when the time measured by the arrival time clock counter 2a reaches the ATS indicated by the corresponding TP_extra_header. Since the output to the PID filter 3 is made at the timing indicated by the ATS, the TS packets are output to the PID filter 3 in accordance with the time measured by the arrival time clock, even in the case where the speed of reading from the BD-ROM varies between, for instance, a 1× speed and a 2× speed.

When two AV Clips are to be played back so that one immediately follows the other, the source depacketizer 2b and corrects variation between the ATC of each of the AV Clips using the ATC_Delta present in the Clip information.

The PID filter 3 judges whether a TS packet belongs to the video stream, the PG stream, or the IG stream by referring to the attached PID, and outputs to one of the transport buffers 4a, 4b or 4c accordingly.

The transport buffers 4a, 4b and 4c are memories which store the TS packets outputted from the PID filter 3 on a first-in first-out basis.

The surrounding circuitry 4d contains wire logic circuitry for performing processing to convert TS packets read from the transport buffers 4a, 4b and 4c into functional segments. The functional segments obtained from the conversion are stored in the coded data buffer 13.

The video decoder 5 decodes the plurality of TS packets outputted from the PID filter 3 to obtain a picture in an uncompressed format and writes the picture to the video plane 6.

The video plane is a plane memory used when presenting moving picture data.

The audio decoder 7 decodes the TS packets outputted from the PID filter, and outputs the audio data in an uncompressed format.

The graphics plane 8 is a plane memory having an area large enough for one screen, and is capable of storing the uncompressed graphics data for the one screen.

The CLUT unit 9 converts index colors in the uncompressed data stored in the graphics plane 8 based on values of Y, Cr, and Cb indicated by the PDS.

The adding device 10 obtains an overlaid picture by multiplying uncompressed graphics converted by the CLUT unit 9 by a T value (degree of transparency), and adding the result, pixel by pixel, to the uncompressed picture data stored in the video plane 6.

The graphics decoder 12 decodes the graphics stream, obtains the uncompressed graphics, and writes the result to the graphics plane 8 as an uncompressed graphics object. Subtitles and menus appear as a result of decoding the graphics stream.

The graphics decoder 12 is constructed from the coded data buffer 13, the surrounding circuitry 13a, the stream graphics processor 14, the object buffer 15, the composition buffer 16, and the graphics controller 17.

The coded data buffer 13 is a buffer in which the functional segments are stored together with the DTSs and PTSs. The functional segments are obtained by removing the TS packet headers and PES packet headers from each TS packet in the transport streams stored in the Transport buffers 4a, 4b and 4c, and sequentially arranging the resulting payloads. The PTSs/DTSs from the removed TS packet headers and PES packet headers are stored in correspondence with the PES packets.

The surrounding circuitry 13a is wire logic for transmitting data back and forth between the coded data buffer 13 and the graphic stream processor 14, and between the coded data buffer 13 and the composition buffer 16. In the processing to realize the transmission, if the current playback time reaches a time indicated in the DTS of the ODS, the surrounding circuitry 13a transmits the ODS from the coded data buffer 13 to the stream graphics processor 14. Also, if the current playback time reaches a time indicated in the DTS of the PDS or PCS, the surrounding circuitry 13a transmits the PCS or PDS to the composition buffer 16.

The stream graphics processor 14 decodes the ODS and writes the uncompressed graphics, which are composed of the indexed colors obtained by decoding, to the object buffer 15 as a graphics object. The stream graphics processor 14 performs the decoding instantaneously, and temporarily stores the resulting graphics object. Although the decoding by the stream graphics processor 14 is instantaneous, the writing from the stream graphics processor to the object buffer is not completed instantaneously. In a player that complies with the BD-ROM standard, the stream graphics processor 14 writes to the object buffer 15 at a transmission rate of 128 Mbps. Since the PTS in the END segment indicates when the writing to the object buffer 15 finishes, the stream graphics processor waits until the timing indicated by the PTS in the END segment before processing a subsequent DS. The graphics processor 14 starts writing the graphics object obtained by decoding an ODS 15 at a time point indicated by the DTS associated with the ODS and completes writing by the decode completion time indicated in the PTS associated with the ODS.

The object buffer 15 is a buffer for holding the graphics object decoded by the graphics stream processor. The object buffer 15 must be twice or four times as large as the graphics plane 8. This is to allow scrolling which requires the graphics plane to store a graphics object twice or four times as large as the graphics plane 8.

The composition buffer 16 is memory for holding the PCS and PDS. In the case that there are two Display Sets to be processed, and an active period of the respective PCSs overlaps, the composition buffer 16a stores a plurality of PCSs.

The graphics controller 17 interprets the PCS. Then, in accordance with the result of this interpretation, the graphical controller 17 writes the graphics object to the object buffer 15, reads the graphics object from the object buffer 15 and executes display of the graphics Object. This takes place at the timing indicated by the PTS for PES packets stored in the PCSs. The interval between display, by the graphics controller 17, of a graphics Object belonging to DSn and of a graphics Object belonging to DSn+1 is the interval described above.

Figure 25:
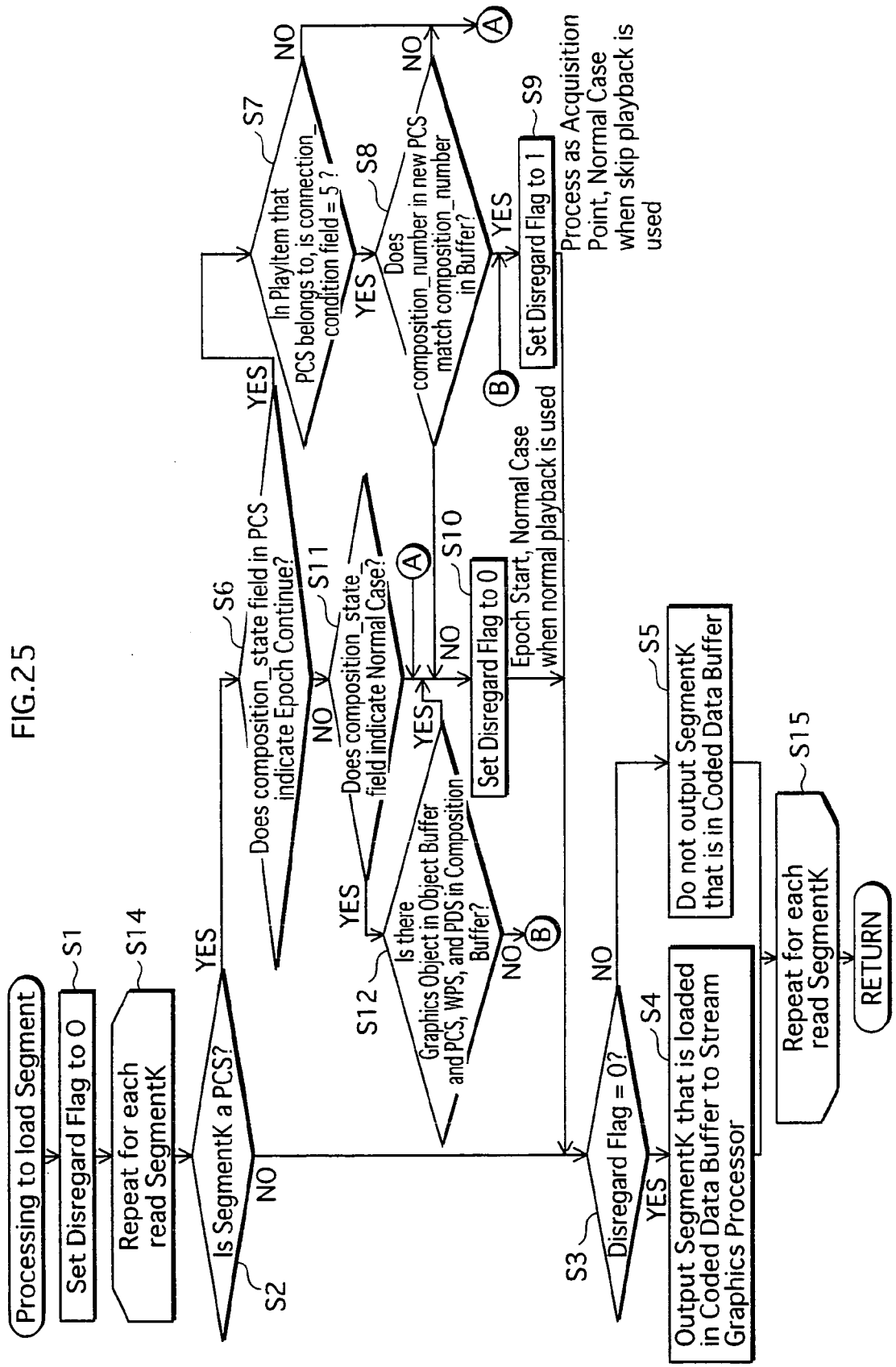
FIG. 25 is a flow chart showing a processing order for loading functional segments.

FIG. 25 is a flow chart showing a processing order for loading functional segments. In the flow chart SegmentK is a variable that refers to each of the Segments (ICS, PDS and ODS) as they are read during playback of the AV Clip. A disregard flag indicates whether to load or disregard a given SegmentK. The flow chart is structured to include an initialization of the disregard flag to 0 (Step 1), and a loop structure for applying the processing of Steps S2 to S13 to each of the Segments (Steps S14 and S15).

The processing of the loop structure (Steps S2 to S15) is repeated for as long as reading of functional segments continues and includes the following. First, it is judged whether the disregard flag is 0 or 1 (Step S3). If the disregard flag is 0, the target functional segment is transmitted from the coded data buffer 13 to either the composition buffer 16 or to the stream graphics processor 14 (Step S4). If the disregard flag is 1, no transmission takes place. Instead, the target functional segment is deleted from the coded data buffer 13 (Step S5).

Whether the SegmentK is loaded or disregarded is decided on the basis of the disregard flag setting. Steps S9 and S10 are processing steps for setting the disregard flag.

Step S6 is for judging whether or not composition_state in a PCS indicates Epoch Continue. If SegmentK is of the Epoch Continue type, Steps S7 to S9 are executed. If SegmentK is of the Normal Case type, Steps S10 to S12 are executed.

Note that in Steps S7 to S9 judgments are made in both Step S7 and Step S8, and the disregard flag is set to 1 (Step S9) only if both of these judgments are in the affirmative.

Step 7 is for judging whether the connection_condition field of the PlayItem to which the PCS belongs is set to 5 (indicating seamless connection). Step 8 is for judging whether the composition_number in a newly read PCS is the same as the composition_number held in the composition buffer 16.

If the either of the judgments in Steps S7 and S8 is in the negative, the processing moves to Step 10, and the disregard flag is set to 0. If the judgments in Steps S7 and S8 are both in the affirmative the disregard flag is set to 1 (Step S9)

Step S11 is a judgment as to whether the composition_state of the newly read PCS is of the Normal Case type or of the Epoch Continue type. If the composition_state is of the Epoch Start type the disregard flag is set to 0 (Step 10).

Step S11 is a judgment as to whether the composition_state of the newly read PCS is of the Normal Case type or of the Epoch Continue type. If the composition_state is of the Normal Case type Step S12 is executed as an additional check. Step 12 is for judging whether a graphics Object is present in the object buffer, and whether a PCS, PDS and WDS are present in the composition buffer 16. If all of these are present, the disregard flag is set to 0 (Step 10). If any are lacking, the processing transfers to Step S9.

If there is no graphics object present in the object buffer, it may be that sufficient functional segments to form an interactive screen were not originally obtained.

FIG. 26 shows a manner in which Display Sets are read when the two AV clips shown in FIG. 14 are played back. Level 3 shows Display Sets multiplexed in an AV Clip, level 2 shows a plurality of pictures that compose a video stream, and level 3 shows states of the graphics decoder.

When DS1, which is positioned at the head of an Epoch, is read, the graphics decoder is reset, and the coded-data buffer 13 reads in order the PCS, WDS, PDS, and ODS that compose the DS1. The PCS, WDS and PDS are then transmitted to the composition buffer 16, and the ODS is outputted to the stream graphics processor.

The arrow mr1 indicates a time at which DSm is read. The coded data buffer 13 reads in order the PCS, WDS, PDS, and ODS constituting the DSm. Since the connection_condition of the DSm is of the Acquisition Point type, the PCS, WDS and PDS are discarded without being transmitted to the composition buffer 16. Moreover, the ODS is discarded without being transmitted to the Stream Graphics Processor.

The arrow mr2 indicates a time at which DSm+1 is read. Here, the graphics decoder judges whether or not the three conditions have been met. If a change stream of the DSm+1 indicates Epoch Continue, if playback of the video streams is seamless, and if a composition_number of DSm+1 matches the composition_number of the PCS in the Composition Buffer, the three conditions are met, and the DSm+1 is treated as an Acquisition Point. With this method, the reproduction device does not reset the graphics decoder, and discards the PCS, WDS and PDS read from the coded data buffer 13 without transmitting them to the composition buffer 16. The reproduction devices similarly discards the ODS without outputting it to the Stream Graphics Processor.

The above describes the processing involved in normal playback. In the case of skip playback of an AV Clip, which occurs as a result of skipping between chapters, a chapter search, or the like, the playback device instantaneously resets the graphics decoder upon receipt of the skip instruction. Consequently, a current composition_number that is managed in the Graphics Decoder, will never match the composition_number of DSm+1 in the AV Clip about to be played. Consequently, in the case of skip playback, the DSm+1 is dealt with as an Epoch Start.

FIG. 27 shows a method for reading to a graphics decoder when skip playback of the AV Clip #2 is carried out in order. Levels 1 to 3 are identical to those in FIG. 26, and the arrows have the same meaning as in FIG. 26. However, since the content of the graphic display in FIG. 27 differs from that of FIG. 26, the composition_number is different. When playback of the following AV Clip begins and the DSm+1 is read by the Coded Data Buffer 13, the graphics decoder interprets the PCS read by the Coded Data Buffer 13, and makes a judgment about the Change Stream. If the Change Stream is of the Epoch Continue type, the graphics decoder makes judgments about the remaining two conditions. Even if the playback of the video streams is to be seamless, the graphics decoder treats the DSm+1 as an Epoch Start type Display Set as a result of the composition_number being different from the preceding AV Clip. Consequently, the graphics decoder is reset, and the PCS, WDS and PDS read by the coded data buffer 13 is transmitted to the composition buffer 16, and the ODS is outputted to the stream graphics processor.

Second Embodiment

The second embodiment relates to setting a PTS for realizing an Epoch Continue. When playing two AV Clips in order, it is necessary to take into account differences in the clocks used for reference by the respective AV Clips. At authoring, the AV Clips are encoded by different machines, and consequently generated based on differing clock signals. The clock used for reference at encoding is known as an STC (System Time Clock). The STC is also used as a reference for the decode processing when the reproduction device plays back an AV Clip.

To playback two AV Clips with differing STCs consecutively, the playback device calculates a and STC difference value (STC_delta), adds the STC_delta to an internal clock time so as to compensate for the differences in STCs. FIG. 28 for comparison shows a PTS value of a video stream belonging to the preceding AV Clip and a PTS value of a video stream belonging to the following AV Clip. In the case that A start time for last graphics display by the playback device during the preceding AV Clip is PTS(1stEND), the picture display period is Tpp, and a starting time at which the first picture of the following AV Clip is displayed is PTS(2ndSTART), the STC_Delta is expressed as $$STC\_delta = PTS(1stEND) + TP - PTS(2ndSTART).$$

STC_delta can be expressed in this way because when two AV clips are played back consecutively, the PTS(1stEND)+Tpp should match PTS(2ndSTART), and the difference between the PTS(1stEND)+Tpp and PTS(2ndSTART) can therefore considered to be the difference in the STCs.

When the two AV Clips are to be played back contiguously, both the PTS(1stEND) and the PTS(2ndSTART) are detected and used to calculate STC_delta. The STC_delta is then added to the counter value of the clock inside the playback device, and the corrected counter value outputted to the video decoder 5, the audio decoder 7, and the graphics decoder 12. By making reference to the corrected counter value, the video decoder 5, the audio decoder 7, and the graphics decoder 12 are able to play back the video streams, the audio streams, and the presentation graphics streams of the respective AV clips without a pause between the two streams.

The value of a PTS(DSm+1[PCS]) of DSm+1 at the head of the graphics stream belonging to the following AV Clip is adjusted to ensure that the above-described processing proceeds smoothly. The nature of the adjustment is to have the PTS1(END)+Tpp and PTS(2ndSTART) indicate the same time. This adjustment is necessary for the following reasons. If the time lag before the first display in the following AV Clip is long, the graphics decoder may be reset. Since the AV Clips in the BD-ROM are each stored in separate files there is a time lag when reading two consecutive files. Consequently, if the reading of the AV Clips is for some reason further delayed, the risk of reset increases greatly. To deal with this problem, the Display Set of the Epoch Continue type at the head of the following AV Clip has the value of PTS(DSm+1 [PCS]) set to indicate an identical time to PTS(1stEND)+Tpp, so that display of the graphics takes place at a timing identical to display of the first picture of the video stream.

Setting the value of PTS(DSm+1) in this way enables the time period between the last display of graphics in the preceding AV Clip and the first display in the following AV Clip to be to be minimized, even when there is a substantial time lag between completing the reading of the preceding AV Clip and starting the reading of the following AV Clip. Since the reproduction device is thereby prevented from resetting, the presence of management data already in the memory can be continuous.

Third Embodiment

Figure 29A:
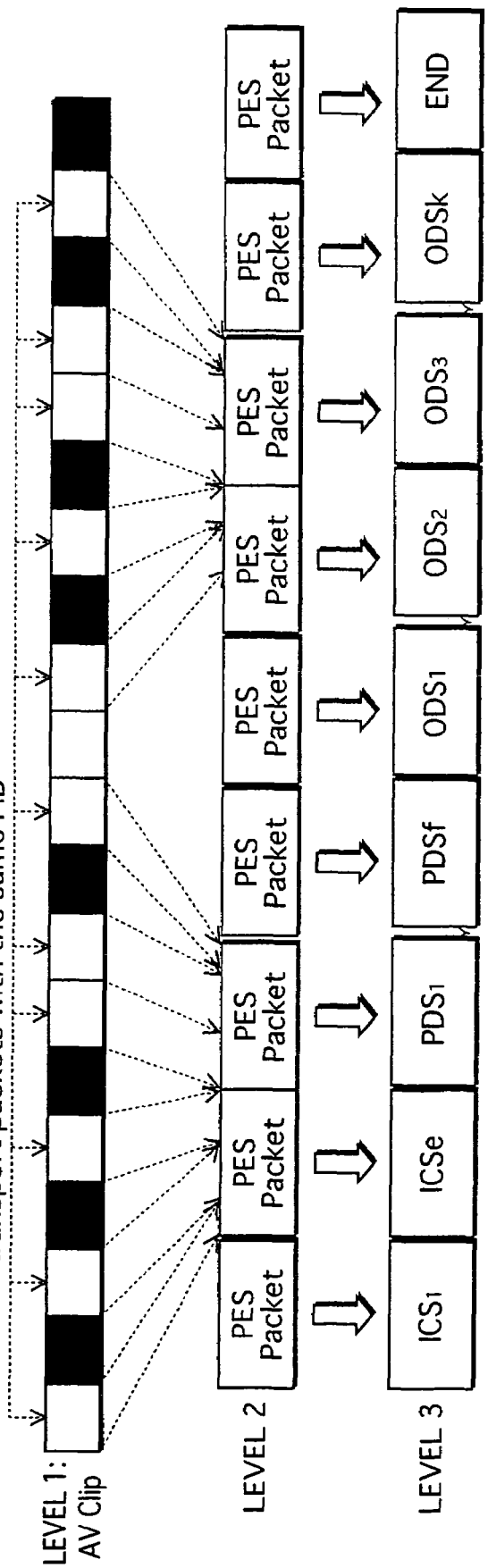
FIG. 29A shows a structure of an interactive graphics stream.

The first embodiment describes the PG stream. The third embodiment, on the other hand, describes the IG stream. The following describes the Interactive Graphics Stream. FIG. 29A shows a structure of an Interactive Graphics Stream. Level 1 shows TS packets that constitute the AV Clip. Level 2 shows the shows PES packets that constitute the graphics stream. The PES packets in the level 2 are constructed by extracting payloads from packets having a predetermined PID and connecting the extracted payloads. Since the presentation graphics stream is unrelated to the main point of the third embodiment, the presentation graphics stream is not described below.

Figure 29B:
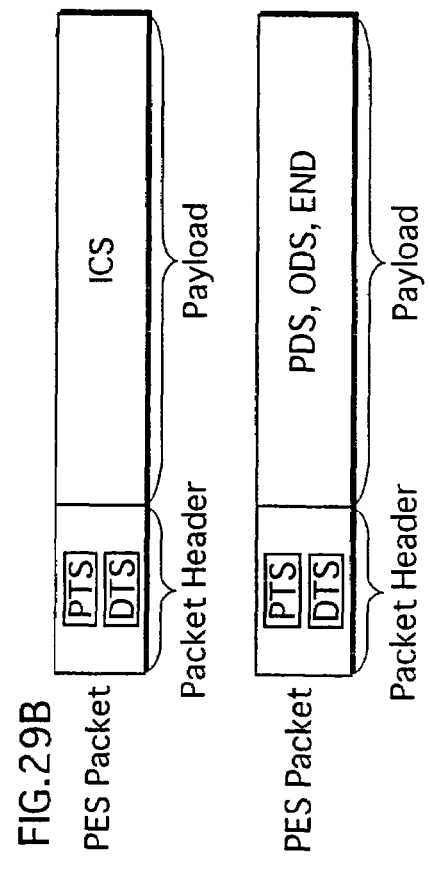
FIG. 29B shows PES packets obtained by converting functional segments.

The third level shows the construction of the Interactive Graphics Stream. The Interactive Graphics Stream composed of functional segments called ICSs (Interactive Composition Segments), PDSs (Palette Definition Segments), ODSs (Object Definition Segments), and ENDs (END of Display Set Segments). Of these functional segments, the ICS is known as a screen composition segment, and the PDS, ODS and END are known as definition segments. The PES packets may be in one-to-one correspondence, or one-to-many correspondence with the functional segments. In other words, each functional segment is either converted to a single PES packet and recorded on a BD-ROM or fragmented, converted into a plurality of packets and stored on a BD-ROM. FIG. 29B shows the PES packets obtained by converting the functional segments.

The following describes the various functional segments. Interactive Composition Segments (ICS) are functional segments for controlling the screen composition of an Interactive Graphics Object. The ICS of the third embodiment is for realizing a multi-page menu.

Figure 30:
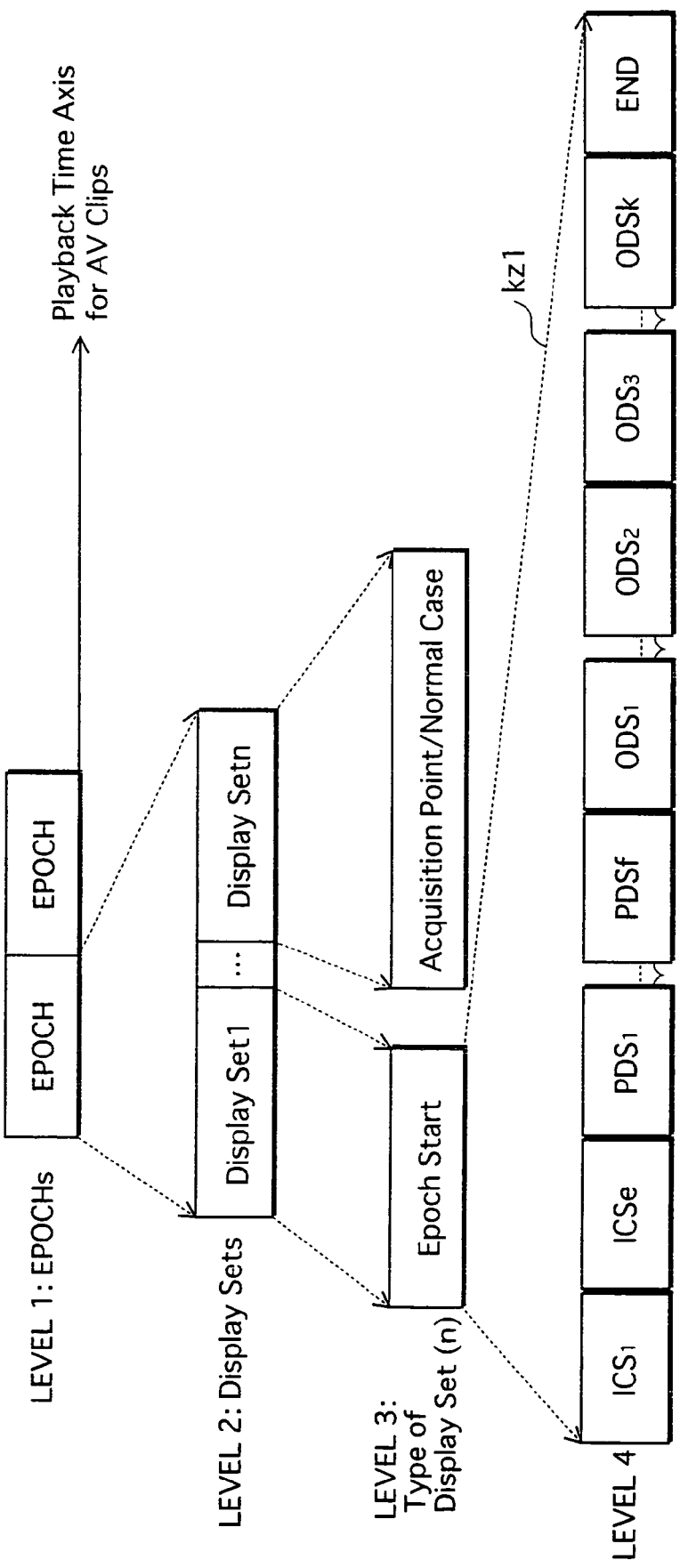
FIG. 30 shows a logical structure made up of functional segments of various types.

The functional segments of various types have a logical structure such as the one shown in FIG. 30. FIG. 30 shows a logical structure made up of functional segments of various types. Level 1 in FIG. 30 shows an Epoch, level 2 shows a Display Sets, and level 3 shows a each of the various types of Display Set. The functional segments shown in level 3 of FIG. 29A are shown in level 4 of FIG. 30. The IG stream also contains Epoch Start-type, Acquisition Point-type and Epoch Continue-type functional segments. However, the ICS differ from the PCSs in that the Acquisition Point-type functional segments allow for update on a page-by-page basis.

The IG stream is characterized by control of behavior of the multi-page menu in accordance with progress, along the above-described playback time axis, of moving picture playback. The new composition that allows this characteristic to be realized relates to an interactive_composition in the ICS. The following describes the internal structure of the interactive_composition.

Figure 31A:
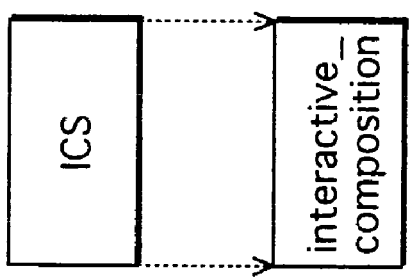
FIG. 31 shows correspondences between ICSs and an interactive_composition.
Figure 31B:
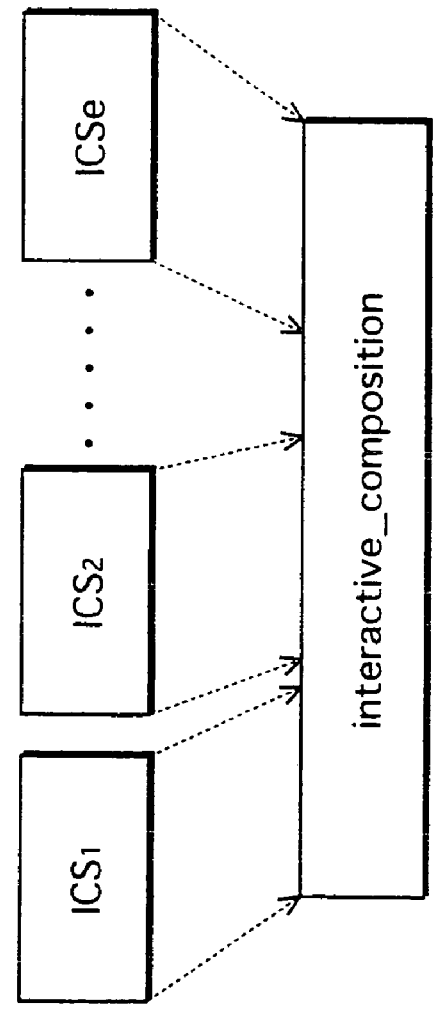

FIG. 31A and FIG. 31B show the correspondence between the ICS and the interactive_composition. The relationship between the ICS and the interactive_composition is either a one-to-one correspondence of the type shown in FIG. 7A or a one-to-many correspondence of the type shown in FIG. 31B.

The relationship is a one-to-one correspondence when a data size of the interactive_composition is small enough to be stored in a single ICS.

The relationship is a one-to-many correspondence when a data size of the interactive_composition is large, and the interactive_composition is fragmented and stored by a plurality of ICS. Since the interactive_composition can be stored using a plurality of ICS, there is no limit to its data size, which may be increased to, say, 512 kMB, 1 MB, or more. A one-to-many correspondence is also possible between the ICS and the interactive_composition. However, for simplicity, the case where the ICS and the interactive_composition are in one-to-one correspondence is used in the following description.

Figure 32:
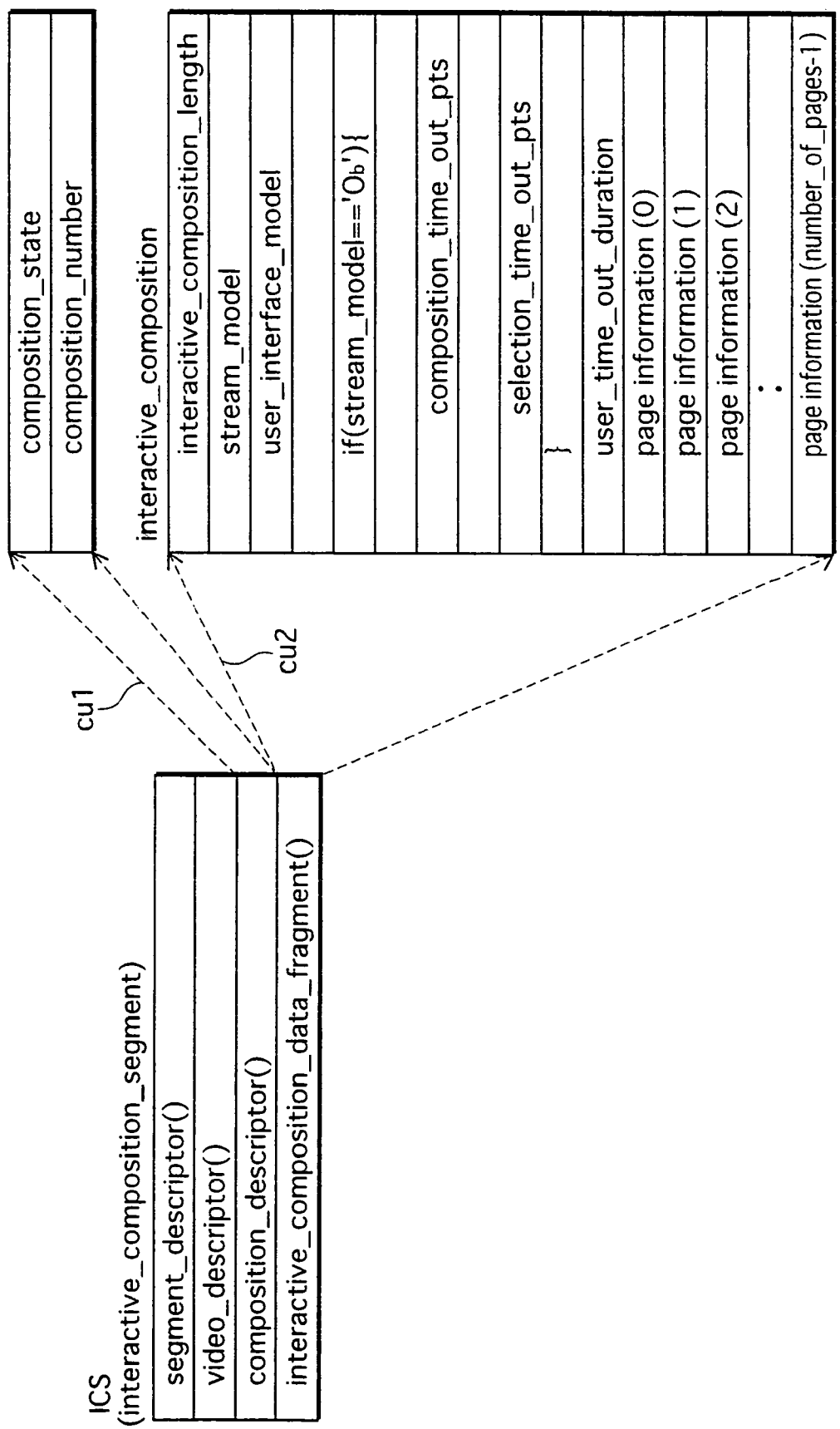
FIG. 32 shows a data structure of an ICS.

FIG. 32 shows a data structure of an ICS. Each ICS stores either an entire interactive_composition or a portion of an interactive_composition obtained by fragmentation. As shown in the left hand side of FIG. 8, the ICS includes a segment_descriptor to indicate that it is an ICS, horizontal and vertical pixel numbers to be used by the ICS, a video_descriptor indicating a frame rate, a composition_descriptor, and an interactive_composition or a portion of an interactive_composition_data_fragment obtained by fragmentation.

The arrow cu1 in FIG. 32 points to a close-up of a data structure of the composition_descriptor. As indicated, the composition_descriptor includes a composition_state field that indicates whether a Display Set to which the ICS belongs is of the Normal Case-type, the Acquisition Point-type, the Epoch Start-type, or Effect_Sequence-type, and a composition_number indicating a count of screen combinations.

The arrow cu2 of FIG. 32 points to a close-up of a data structure of the interactive_composition. As indicated, the interactive_composition includes an interactive_composition_length field, a stream_model field, a user_interface_model field, a composition_time_out_pts, a user_time_out_duration, and pieces of page information (1) (2) ... (i) ... (number_of_page-1), each of which corresponds to a displayable page in the multi-page menu.

The interactive_composition_length field indicates the data length of the interactive_composition.

The stream_model field indicates a type of stream model the interactive_composition is using. The stream model indicates the format used to record the interactive_composition on the BD-ROM, and the manner in which the interactive_composition is to be managed by the composition buffer in the reproduction device. Specifically, the stream model indicates whether the graphics stream i) has been demultiplexed from an AV Clip and loaded in the composition buffer or ii) has been preloaded in the composition buffer as a SubClip.

The user_interface_model field indicates whether the user type of user interface assumed by the interactive composition is an Always-on U/I or a Pop-upU/I. With an Always-on U/I a menu display/deletion occurs in accordance with playback progress of the AV Clip. With a Pop-upU/I, a menu display/deletion is triggered by a user operation.

The composition_time_out_pts indicates an end period (Epoch END) of the Epoch to which the ICS belongs. Since interactive control by means of the ICS becomes impossible at the end period, the time point indicated by the composition_time_out_pts indicates the end of interactive control.

The selection_time_out_pts indicates a time period allowed for a button in a selected state to automatically activate. More specifically, each button corresponds to an item selection on the multi-page menu, and the selection_time_out_pts stipulates the time taken to alter the button to an active state upon selection.

The IF statement in FIG. 32 (if(Stream_model=='0b')) shows that the above-described composition_time_outputs and selection_time_out_pts are information elements that appear only when the stream_model field=multiplexed. If the stream model is preloaded, neither the composition_time_out field nor the selection_time_out field are used The user_time_out_duration field indicates a period of time allowed before deletion for a page displayed in response to a user operation. In the case of the Always-on U/I, since only pages from the second page onwards are displayed in response to user operations, only these SubPages are deleted when the user_time_out duration has elapsed. After the Sub-Pages are deleted, the first page is displayed in the case of the Pop-upU/I, on the other hand, since the every page of the multi-page menu is displayed in response to a user operation, all pages are deleted when the user_time_out_duration has elapsed. The result is a state in which nothing is displayed (No Menu Display).

FIG. 33 shows a data structure of page information for a given page (page y) among a plurality of pages in an x-th Display Set. As indicated to the right-hand side of FIG. 33, the page information (y) includes i) a page_id that uniquely identifies page(y)

ii) the content of the data structure conveyed by the page information (y), including a UO_mask_table field, an in_effect field, an out_effect field, an animation_frame_rate_code field, a default_selected_button_id_ref field, an animation_frame_rate_code field, a default_selected_button_id_ref field, a default_activated_button_id_ref field, a pallete_id_ref field, and button information (0)(1) . . . (number of buttons−1), and iii) a page_version_number indicating a version number of the content of the page information (y).

The following describes the various fields that constitute the data structure conveyed by the page information (y).

The UO_mask_table field is a table used to permit/disallow user operations relating to the page(y).

The in_effect field indicates a display effect that is to be reproduced at first display of the page (y). The out_effect indicates a display effect to be reproduced upon display completion.

The animation_frame_rate_code field-de scribes a frame rate that is to be applied when displaying animation in page (y).

The default_selected_button_id_ref field indicates whether buttons whose default state is the selected state are determined dynamically or passively. Specifically, when the field contains 0xff, the buttons whose default state is the selected state are determined dynamically. In this case, settings values in the Player Status Register (PSR) in the reproduction device are preferentially interpreted, and the buttons indicated in the PSR are set to the selected state. When the field does not contain 0xff, the buttons whose default state is the selected state are determined statically. In this case, the button numbers stipulated in the default_selecte_button_id_ref field are written over the PSR, and the corresponding buttons are set to the selected state.

The default_activated_button_id_ref field indicates buttons automatically set in the active state when a time point indicated by the selection_time_out_pts is reached.

If the default_activated_button_id_ref field contains FF, the button in the selected state for the predetermined period is automatically selected. If the default_activated_button_id_ref field contains 00, the button in the selected state is not automatically selected. When the default_activated_button_id_ref field contains a value other than 00 or FF, the value is interpreted as an effective button number The pallete_id_ref field indicates the id of the palette to be set in the CLUT unit for the page(y).

The button information (button_info field) defines each button displayed on the page(y). The above-described fields specify the contents of each page in the multi-page menu.

The page_version_number field indicates a version of the content conveyed by the page information (y) in an Epoch. Since the page_version_number field is a main feature of the current present invention, a detailed description is provided below. The version of page information (y) indicates a number of updates implemented on the content of the data structure conveyed by the page information. The data structure of page information (y) is said to have been updated if there are one more changes in the values contained in the fields after the page_version_number field.

The version indicated by the page_version_number field is expressed using a serial number in a single Epoch. As a result, the value contained in the page_version_number field varies according to the Display Set that holds the page information in the Epoch. During the Epoch, the page_version_number field in the page information belonging to the Epoch Start Display Set is set to an initial value (=0). From the second Display Set in the Epoch onwards, the page_version_number fields belonging to the Display Sets that permit updates (i.e. Acquisition Point-type and Normal Case-type Display Sets) are each set to a value indicating a number of updates.

Figure 34:
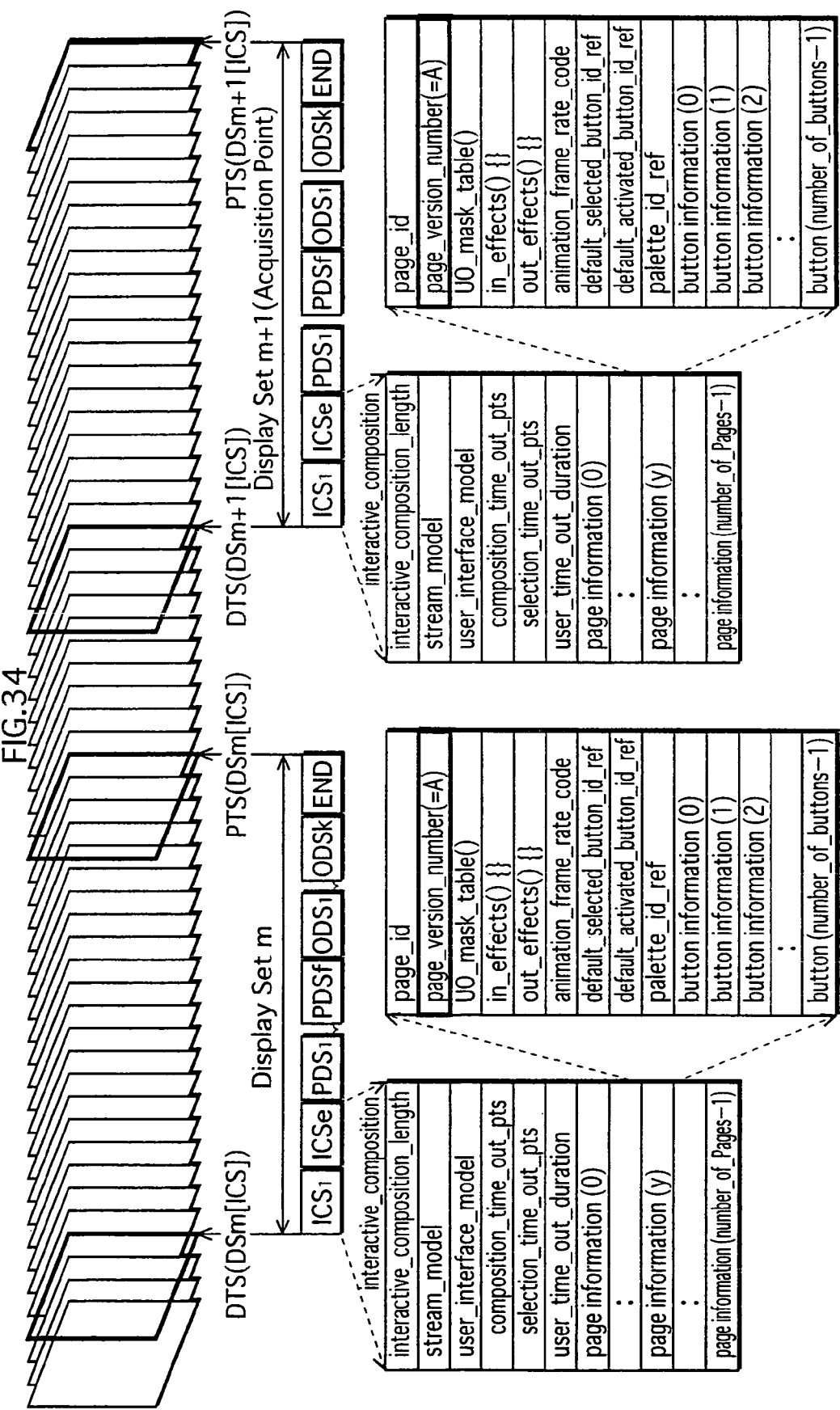
FIG. 34 shows setting for a page_version_number field in two consecutive Display Sets (DSx+1, DSx)
Figure 35:
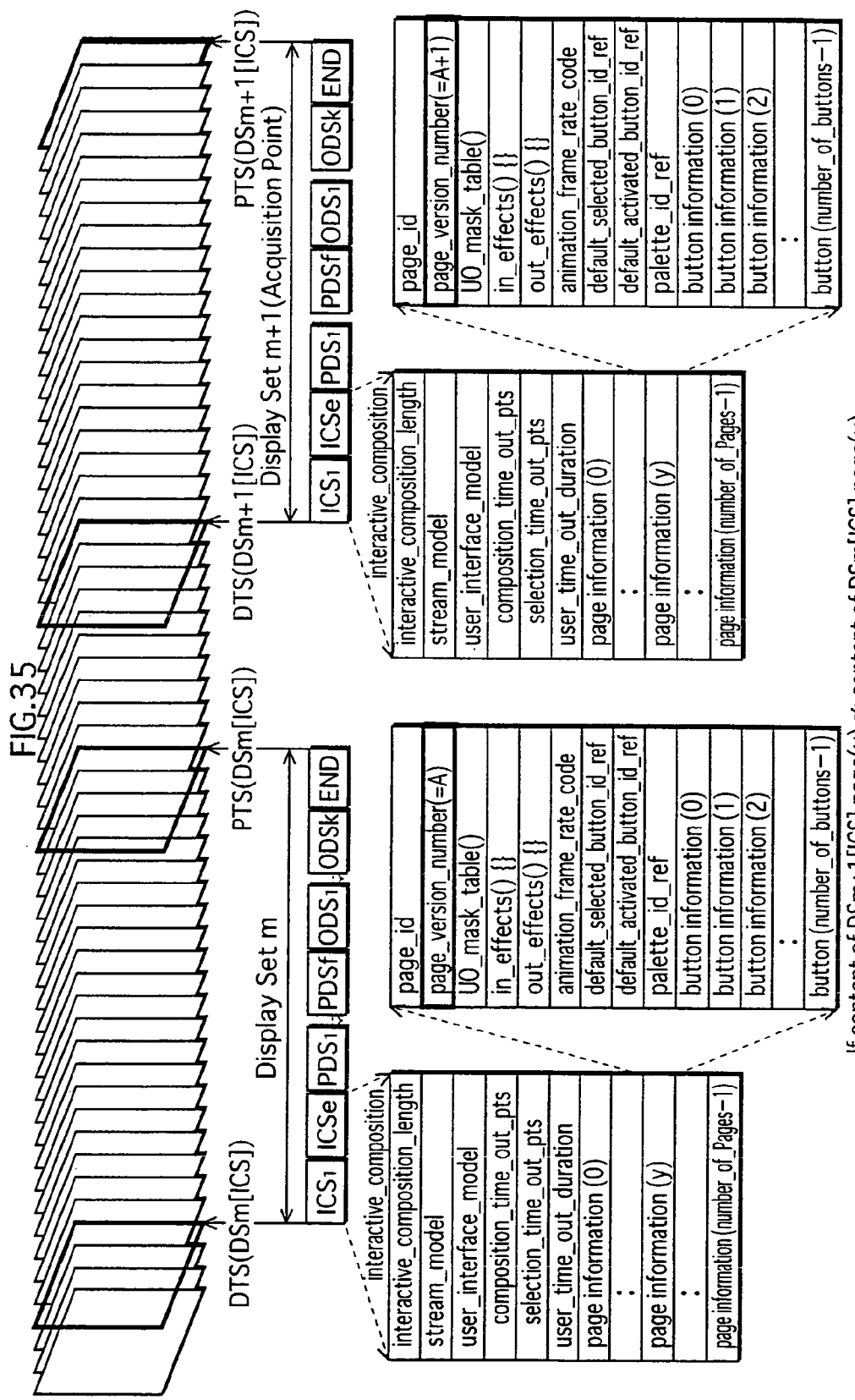
FIG. 35 shows settings for the page_version_number field in two consecutive Display Sets (DSx+1, DSx)

The following describes the page_version_number in detail with reference to a specific example shown in FIG. 34. FIG. 34 shows settings for the page_version_number field in two consecutive Display Sets (DSx+1, DSx). DSx+1 is an Acquisition Point-type Display Set, and FIG. 34 shows arbitrary page information (y) in this Display Set. When the content of the page information(y) of DSx+1 is identical to that of DSx, the page_version_number field of the page information (y) in DSx+1 is set to the same value as the page_version_number fields in the page information (y) in DSx. By referring to these page_version_number fields, the reproduction device is able to judge that the content of page information (y) has not altered between the DSx and the DSx+1. Contrastingly, in FIG. 35 the content of the page information (y) in the DSx+1 differs to that in the page information (y) of the DSx. In this case, the value (=A+1) contained in the page_version_number field of the DSx+1 is incremented by one from that contained in the page information (y) of the DSx. The reproduction device is therefore able to discover whether the page information (y) in the DSx+1 has altered from the page information (y) in the DSx.

Figure 36:
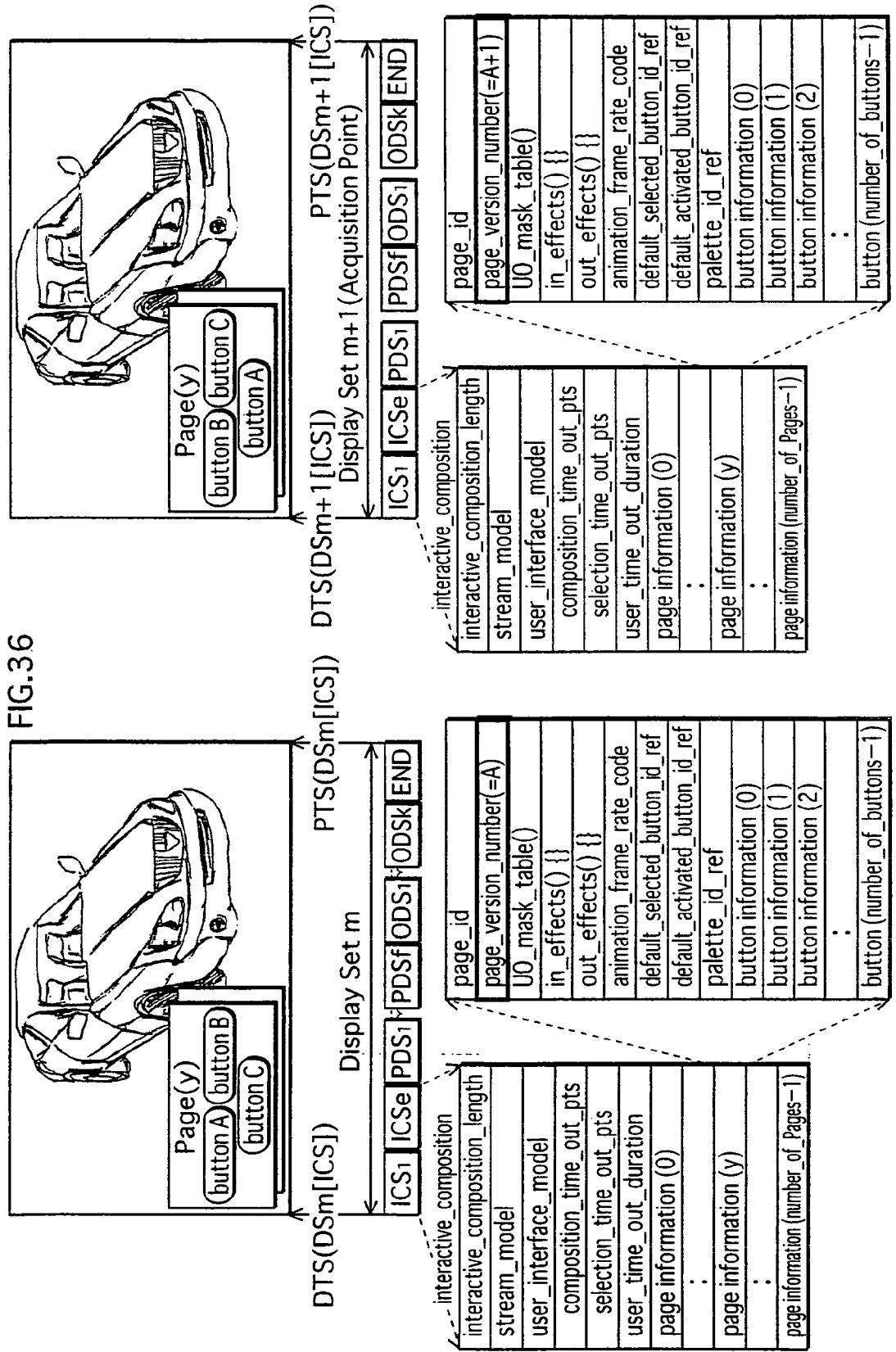
FIG. 36 shows a page composed of page information (y) in Dsx and Page information (y) in DSx+1 for comparison.

FIG. 36 shows a page composed of page information (y) in the Dsx and Page information (y) in the DSx+1 for comparison.

The page constituted by the page information (y) in the DSx+1 has three buttons (A,B and C) disposed in an order: B, C, A.

On the other hand, the page constituted by the page information (y) in the DSx+1 has the three buttons (A,B and C) disposed in an order: A, B, C. The only difference between the two pages is that the order of appearance of the buttons, which alters from A,B, C to B, C, A. Even in the case of such small variations, however, the value contained in the page_version_number field in the page information (y) of the DSx+1 will increment. By setting the page_version_number field in this way, it is possible to signal to the reproduction device the existence of small changes in the page information (y).

The above description gives an example of an Acquisition Point-type Display Set in the interactive_composition. Note, however, that there is a page_version_number field in each piece of page information in the Normal Case-type Display Sets in the interactive_composition. Moreover, the page_version_number field can be made to indicate that content has altered between pages.

As in the first embodiment, when a preceding AV Clip and a following AV Clip satisfy the three conditions, the Epoch Continue-type Display Set can be treated as an Acquisition Point-type Display Set. Moreover, in the Acquisition Point-type Display Set it is possible to increment the page_version_number in each piece of page information. Thus, among the pieces of page information in the ICS, which is stored in the composition buffer 16 and to which the Epoch Continue-type Display Set belongs, it is possible to limit updating to those pieces of page information whose page_version_number fields have increased.

The above description relates to an improvement over the prior art in the recording medium of the third embodiment. The following describes the reproduction device of the third embodiment. Since the above-described IG stream is constituted in the same way as the PG stream, playback to the IG stream can be performed using the reproduction device having the internal structure shown in FIG. 24.

Figure 37:
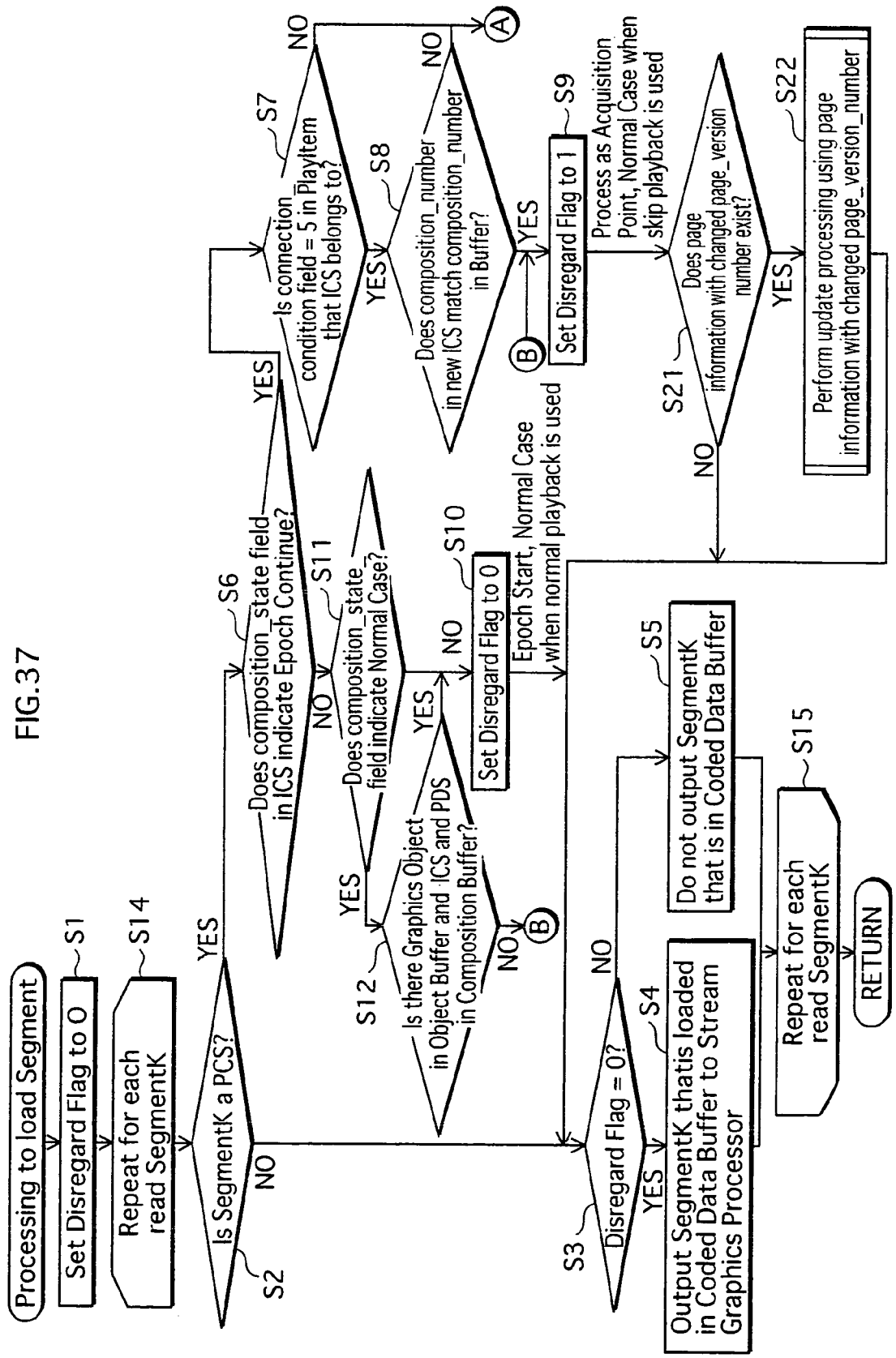
FIG. 37 show a processing order followed by a graphics controller 17 when there is an Epoch Continue-type Display Set in an IG stream.

The Epoch Continue-type Display Set exists in the IG stream, and the graphics controller 17 of the third embodiment therefore performs processing in accordance with the flow chart of FIG. 37. This flow chart is the flow chart of FIG. 25 but with the letters ICS substituted for the letters PCS. Besides this substitution, the flow chart of FIG. 37 has additional steps of Step S21 and Step S22. Step S21 is executed in the case that the judgments of both Step S7 and Step S8 are both affirmative and segmentK is to be treated as an acquisition point. In Step S21, the reproduction device judges whether or not page information having an altered page_version_number exists, and if judging in the affirmative, exchanges the corresponding page in the interactive_composition in the composition buffer 16 for a new page. It is thereby possible to update each piece of page information in the Epoch Continue-type Display Sets.

According to the third embodiment described above, Epoch Continue-type Display Sets are present among the Display Sets used to realize the display of menus, and it is therefore possible to perform consecutive playback of two AV Clips without breaks occurring.

Fourth Embodiment

Figure 38:
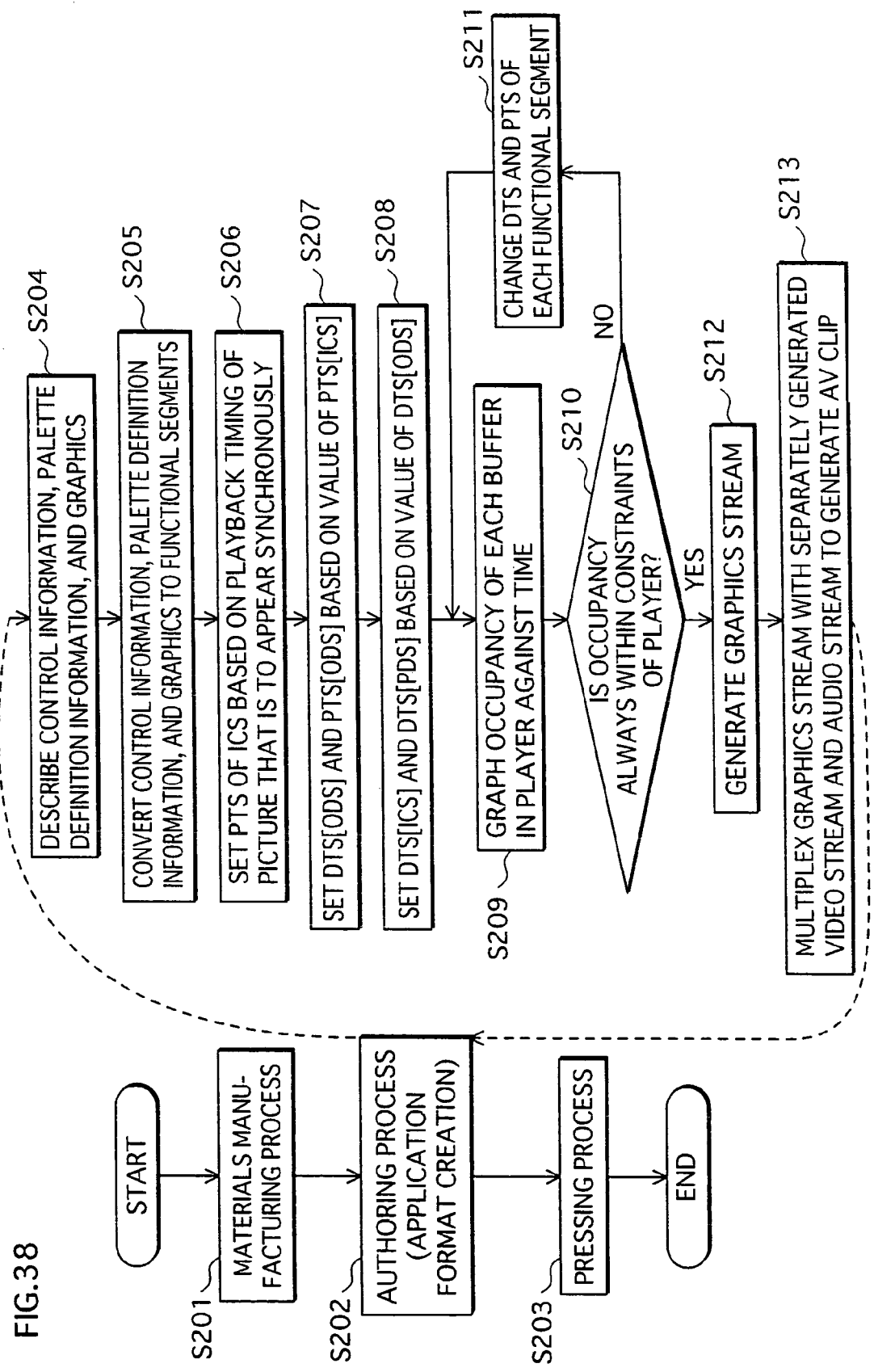
FIG. 38 is a flow chart showing a manufacturing process for producing a BD-ROM described in the first to third embodiments.

The fourth embodiment relates the manufacturing process of the BD-ROM. FIG. 38 is a flow chart showing the manufacturing process for producing the BD-ROM described in the first to third embodiments.

The BD-ROM manufacturing process includes a material production process S201 in which material is produced by methods such as recording moving pictures and sound, an authoring process S202 in which the material is formatted to an application format using an authoring machine, and a pressing process S203 to complete the BD-ROM through production of a master disk and pressing/sticking.

The authoring process for the target BD-ROM further includes the Steps S204 to S213, which are described below.

The following describes Steps S204 to S213. In Step S204 control information, palette definition information, and graphics are described. In Step S205, the control information, the palette information, and the graphics are converted to functional segments. In Step S206, the ICS and PTS are set based on a playback timing of a picture that is to be synchronous. In Step S207, DTS[ODS] and PTS[ODS] are set based on a value of PTS[ICS]. In Step S208 DTS[ICS] and PTS [PDS] are set based on a value of DTS[ODS].

In Step S209 occupancy of each of the buffers in the player is plotted against time. In Step S210, it is judged whether or not the plotted transitions stay within constraints of the player model. If the judgment is in the negative, each functional segment is overwritten in Step S211. If the judgment is in the affirmative, a Graphics Stream is generated in Step S212, and the graphics stream is multiplexed with a video stream and an audio stream to form an AV Clip in Step S213. The AV Clip is then adapted to the BD-ROM format to complete the application format.

Modifications

Though the present invention has been described by way of the above embodiments, the present invention is not limited to such. The present invention can be realized with any of the modifications (A) to (L) below. The present invention of the claims of this application includes extension and generalization of the above embodiments and their modifications below. The degree of extension and generalization included is based on the state of the art in the technical field of the present invention at time of application.

(A) The above embodiments relate to the case where BD-ROM is used as the recording medium. The main features of the present invention, however, are to be found in the Graphics Stream recorded on the recording medium and are not dependent on the physical characteristics of BD-ROMs. Therefore, the present invention is applicable to any recording medium able to record a graphics stream. Examples of such a recording medium include: an optical disk such as a DVD-ROM, a DVD-RAM, a DVD-RAM, a DVD-RW, a DVD-R, a DVD+RW, a DVD+R, a CR-R or a CD-RW; a magneto-optical disk such as a PD or an MO; a semiconductor memory card such as a CompactFlash card, a SmartMedia card, a Memory Stick card, a MultiMediaCard, or a PCM-CIA card; a magnetic disk such as a flexible disk, SuperDisk, Zip or Clik!; a removable hard disk drive such as ORB, Jaz, SparQ, SyJet, EZFley, of Microdrive; a nonremovable hard disk drive.

(B) The above embodiments describe the case where the reproduction device decodes an AV Clip recorded on the BD-ROM and output the decoded AV Clip to the television. As an alternative, the reproduction device may only have a BD drive with the remaining construction elements being provided in the television. In this case, the reproduction device and the television can be incorporated into a home network using an IEEE 1394 connector. Moreover, though the above embodiments describe the case where the reproduction device is connected to the television, the reproduction device may instead be integrated with a display device. Also, the reproduction device of the any of the embodiments may contain only the system LSI (integrated circuit) that performs essential processing. The above described reproduction devices and integrated circuits are all within the scope of the present invention described in this specification. Thus any act of manufacturing a reproduction device based on the internal construction of the reproduction device described in the embodiments is an act of implementing the present invention. Moreover, any act of assigning a charge (i.e. selling), giving, leasing, and/or importing the reproduction device is an act of implementing the present invention.

Since information processing using the programs shown in the flow charts realized using hardware resources, the programs describing the operation procedures shown in the flow charts by themselves constitute an present invention. The above embodiments describe the case where the programs are incorporated with in the reproduction apparatus, but the programs can be implemented separately from the reproduction device as described in the first embodiment. Acts of implementing the programs include (1) an act of producing, (2) an act of assigning with or without charge, (3) an act of leasing, (4) an act of importing, (5) an act of providing to the public via a bi-directional electronic communications network, and (6) an act of offering for assignment or lease for storefront displays, catalogs, or brochures.

Executed in series, the steps in the flow charts can be regarded as the necessary elements of the present invention. Thus, the procedure shown by these flow charts discloses a form of use of the playback method. If the processing of the steps shown in any of the flow-charts is performed in sequence so as to achieve the intended aim and intended effect of the present invention, this clearly constitutes an implementation of the recording method of the present invention.

(E) When used in a home network interconnected via IEEE 1394, the reproduction device may transmit an Aligned Unit using the following processing. The reproduction device removes a TP_extra_header from each of the 32 EX TS packets in the aligned unit encrypts the body of each TS packet according to the DTCP Specification, and outputs the encrypted TS packets. When outputting the TS packets, the reproduction device inserts an isochronous packet between adjacent TS packets. The insertion position determined based on a time indicated by an arrival_time_stamp in TP_extra_header. The reproduction device outputs a DCTP_descriptor together with the output packets. The DCTP_descriptor corresponds to a copy permission indicator in the TP_extra_header. When the reproduction device is used in a home network interconnected via IEEE 1394 and the DCTP_descriptor indicates "copying prohibited", the TS cannot be recorded to other devices.

(F) The digital streams of the above embodiments are AV Clips in the Blu-ray Disk Read-Only Format, but the present invention can also be realized using a VOB (Video Object) of the DVD-video Format, or the DVD-Video Recording Format. The VOB is a recording stream that complies with the ISO/IEC13818-1 Standard and is obtained by multiplexing a video stream and an audio stream. Also, the video stream in the AV Clip may be an MPEG 4 video stream or a WMV video stream. Further, the audio stream in the AV Clip may be a Linear PCM audio stream, a Dolby AC-3 audio stream, an MP3 audios stream, an MPEG-AAC audio stream, or a dts audio stream.

(G) The movie described in the above embodiments may be obtained by encoding an analog image signal that has been broadcast using analog broadcasting techniques. Alternatively, the movie may be stream data made up of a transport stream that has been broadcast using digital broadcasting techniques.

An analog/digital image signal recorded on videotape may be encoded to obtain content. An analog/digital image signal directly captured by a video camera may be encoded to obtain content. Another possibility is that the content is a digital work distributed by a distribution server.

(H) The Graphics Objects described in the above embodiments is run-length encoded raster data. The reason that run-length encoding is used to compress/encode Graphics Objects is that run-length encoding is suitable for the compression and decompression of subtitles. One of the properties of subtitles is that a relatively large number pixels having the same pixel value are aligned in the horizontal direction. Due to this property, it is possible to obtain a high compression ratio when compression is carried out using run length encoding. Moreover, since the decompression load is light, and the processing to decode the compressed data is suitable for a software implementation. In the device used to realize the decoding, the same compression/decompression method is used for the Graphics Object as for the subtitles. Note however, that the use of run length encoding on the Graphics Object is not essential to the present invention. For instance, the Graphics Objects may be PNG data, vector data or transparent parents.

(I) The transmission rate Rc may be set so that clearing of the graphics plane and rendering are completed within a vertical blanking time. If the vertical blanking time is set to 25% of 1/29.93 seconds, the Rc will be 1 Gps. This way of setting Rc enables graphics to be displayed smoothly, and is very effective in practice.

In addition to taking place within the vertical blanking time, the writing can be synchronized with a line scan. This enables the subtitles to be displayed smoothly with Rc=256 Mps (J) The reproduction device in the above embodiments includes a graphics plane. However, a line buffer that stores the uncompressed pixels of one line may be used in place of the graphics plane. Conversion to an image signal is possible using the line the buffer since such conversions are performed one line at a time.

(K) The graphics plane in the above embodiments is preferably made up of a double buffer. In the case that graphics plane is made up of a double buffer, it is possible to switch between screens instantaneously, even when graphics having a large data size are written to the graphics plane over a period of a number of frames. The inclusion or lack of the double buffer is therefore significant if full screen menus are to be displayed.

Three conditions are described for a Display Set(DSm+1) to be treated as an Acquisition Point. First, the Display Set (DSm+1), which directly follows the AV Clip boundary; must be of the Epoch Continue-type (Condition 1). Second, the composition_number contained in the PCS belonging to the DSm+1 must be identical to the composition_number contained in a directly preceding Display Set DSm (Condition 2). Third, playback of the preceding AV Clip and playback of the following AV Clip must be seamlessly connected. However, the second and third of these conditions are not necessary conditions. Provided that the first condition is satisfied (i.e. the Display Set (DSm+1) that immediately follows the AV Clip boundary is of the Epoch Continue type), the Display Set DSm+1 can be treated as an Acquisition Point.

INDUSTRIAL APPLICABILITY

The recording medium and reproduction device of the present invention can be used as part of a home theater system or the like. However since the above embodiments disclose internal constructions of recording medium and reproduction device of the present invention, and the and mass production is possible based on the disclosed internal constructions, the recording medium and the reproduction device are of industrial use. In other words, the recording medium and the reproduction device have industrial applicability.

The invention claimed is:

1. A recording method comprising:
generating a video stream and a graphics stream, and multiplexing the video stream and the graphics stream to obtain one or more digital streams;
obtaining a recording medium having recorded thereon the one or more digital streams,
the video stream constitutes a moving picture,
the graphics stream constitutes graphics to be overlaid on the moving picture, and includes status information, and
if the digital stream is to be played back by a reproduction device immediately following another digital stream seamlessly, the status information indicates that presence of management data already in a memory for graphics display is to be continuous in said generating.

2. The recording method of claim 1, wherein the recording medium further has recorded thereon playback path information that indicates a playback path for each digital stream, wherein
the playback path information includes a seamless flag that indicates whether or not moving picture playback is to be seamless at a boundary between the digital stream and the other digital stream, and
the indication by the status information is permitted only if the moving picture playback is to be seamless.

3. The recording method of claim 1, wherein
the status information includes a count number that shows a number of times that graphics have been displayed.

4. The recording method of claim 3, wherein
the indication of continued presence is permitted only if the count number in the status information matches a last count number in the other digital stream.

5. The recording method of claim 1, wherein
the status information is contained in at least one packet,
the display timing of the graphics is shown by a time stamp that is included in the packet, and
a value of the time stamp is obtained by adding a predetermined offset to a display timing of a last picture in a video stream in the other digital stream.

6. A reproduction device for playing back a plurality of digital streams each generated by multiplexing a graphics stream and a video stream, the reproduction device comprising:
a video decoder operable to decode each video stream to obtain a moving picture; and
a graphics decoder operable to decode each graphics stream to obtain graphics that are to be overlaid on a corresponding moving picture, wherein
each graphics stream includes status information,
the graphics decoder includes a memory and a controller,
the memory stores management data for the presentation of the graphics, and
if playback of the digital stream is to seamlessly follow playback of another digital stream, the controller judges whether or not the status information included in the graphics stream of the digital stream is of a predetermined type, and if judging affirmatively, causes the presence of management data in the memory to be continuous.

7. The reproduction device of claim 6, wherein
even when the status information is of the predetermined type, the controller resets the memory in the graphics decoder (i) if playback of the digital stream is not to immediately follow playback of the other stream, (ii) if playback is to start from midway through the digital stream, or (iii) if playback of the digital stream and the other digital stream is non-seamless.

8. The reproduction device of claim 6, wherein
status information in each graphics stream includes a count number that shows a number of times graphics have been displayed during digital stream playback, and
the continued presence indicated by the status information in the graphics decoder is permitted only when the count information of the digital stream matches count information for last graphics in the other digital stream.

9. The reproduction device of claim 6, wherein
the plurality of digital stream is recorded on a recording medium together with playback path information that indicates a playback path for each digital stream, p1 the playback path information includes a seamless flag that indicates whether or not moving picture playback is to be seamless at a boundary between the digital stream and the other digital stream, and
the indication by the status information is permitted only if the moving picture playback is to be seamless.

10. A method for playing back a plurality of digital streams each generated by multiplexing a graphics stream and a video stream, the method comprising:
decoding each video stream to obtain a moving picture; and
decoding each graphics stream to obtain graphics that are to be overlaid on a corresponding moving picture, wherein
each graphics stream includes status information, and
if playback of the digital stream is to seamlessly follow playback of another digital stream, the step to obtain the graphics judges whether or not the status information included in the graphics stream of the digital stream is of a predetermined type, and if judging affirmatively, causes the presence of management data in a memory in a computer to be continuous.

* * * * *

UNITED STATES PATENT AND TRADEMARK OFFICE
CERTIFICATE OF CORRECTION

PATENT NO. : 7,660,516 B2
APPLICATION NO. : 10/587055
DATED : February 9, 2010
INVENTOR(S) : McCrossan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 795 days.

Signed and Sealed this

Thirtieth Day of November, 2010

David J. Kappos
*Director of the United States Patent and Trademark Office*